United States Patent [19]

Morel et al.

[11] Patent Number: 5,721,919

[45] Date of Patent: Feb. 24, 1998

[54] METHOD AND SYSTEM FOR THE LINK TRACKING OF OBJECTS

[75] Inventors: William Paul Morel, Redmond; Edward Koo Young Jung, Seattle, both of Wash.

[73] Assignee: Microsoft Corporation, Redmond, Wash.

[21] Appl. No.: 259,227

[22] Filed: Jun. 20, 1994

Related U.S. Application Data

[63] Continuation-in-part of Ser. No. 85,186, Jun. 30, 1993.

[51] Int. Cl.$^6$ .................................................... G06F 7/00
[52] U.S. Cl. .................................................... 395/619
[58] Field of Search .................................. 395/700, 600, 395/650

[56] References Cited

U.S. PATENT DOCUMENTS

| | | | |
|---|---|---|---|
| 4,558,413 | 12/1985 | Schmidt et al. | 395/600 |
| 5,303,379 | 4/1994 | Khoyi et al. | 395/700 |
| 5,325,524 | 6/1994 | Black et al. | 395/600 |
| 5,327,680 | 7/1994 | Adams et al. | 395/600 |
| 5,377,323 | 12/1994 | Vasudevan | 395/200 |
| 5,421,012 | 5/1995 | Khoyi et al. | 395/650 |
| 5,421,015 | 5/1995 | Khoyi et al. | 395/650 |
| 5,463,774 | 10/1995 | Jenness | 395/600 |
| 5,499,369 | 3/1996 | Atkinson | 395/650 |

FOREIGN PATENT DOCUMENTS

| | | | |
|---|---|---|---|
| 0 304 071 A3 | 2/1989 | European Pat. Off. | G06F 9/46 |
| WO 93/03448 | 2/1993 | WIPO | G06F 15/40 |

OTHER PUBLICATIONS

Sedgewick, Robert, "Algorithms in C", Addison–Wesley, pp. 231–243, 1990.
Rochkind, Marc, J., "Advanced UNIX Programming", Prentice–Hall, Inc., pp. 2, 3, 20, 21, 49, 54–57, 1985.

Primary Examiner—Kevin A. Kriess
Assistant Examiner—St. John Courtenay, III
Attorney, Agent, or Firm—Seed and Berry LLP

[57] ABSTRACT

A method and system for tracking, and resolving links to, objects that derive from a common object creation is provided. In a system, the system creates a source object. The system then generates a lineage identifier to identify the creation of the source object. Then the system associates the lineage identifier with the source object. At a later time, the system copies the created object to a copy object. When the source object is copied to a copy object, the system associates the lineage identifier associated with the source object with the copy object. In this way, the lineage identifier associated with the copy object indicates that the copy object derives from the creation of the source object.

The system links a client object to a source object by storing a link containing the source object's lineage identifier in the client object. A link also contains information for distinguishing the source object from other objects having the same lineage identifier. When resolving the link to the source object, the system selects the lineage identifier and the distinguishing information contained in the link. The system then searches for an object with the selected lineage identifier and distinguishing information. When an object with the selected lineage identifier and distinguishing information is found, the system resolves the link to the found object. When an object with the selected lineage identifier and distinguishing information is not found, the system searches for an object with the selected lineage identifier without regard to the selected distinguishing information. When an object with the selected lineage identifier is found, the system resolves the link to this found object.

20 Claims, 20 Drawing Sheets

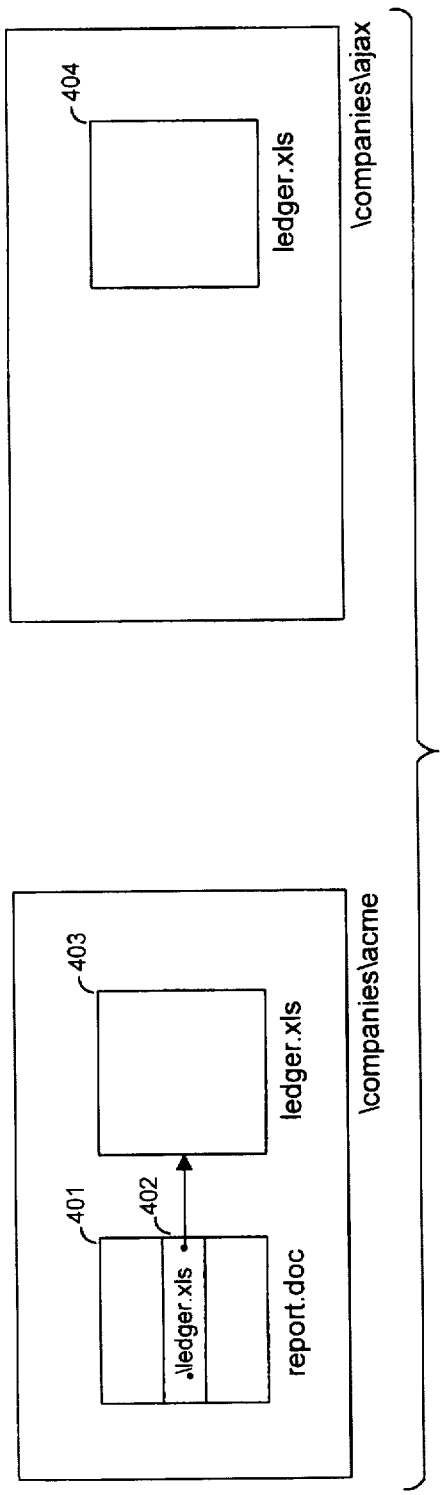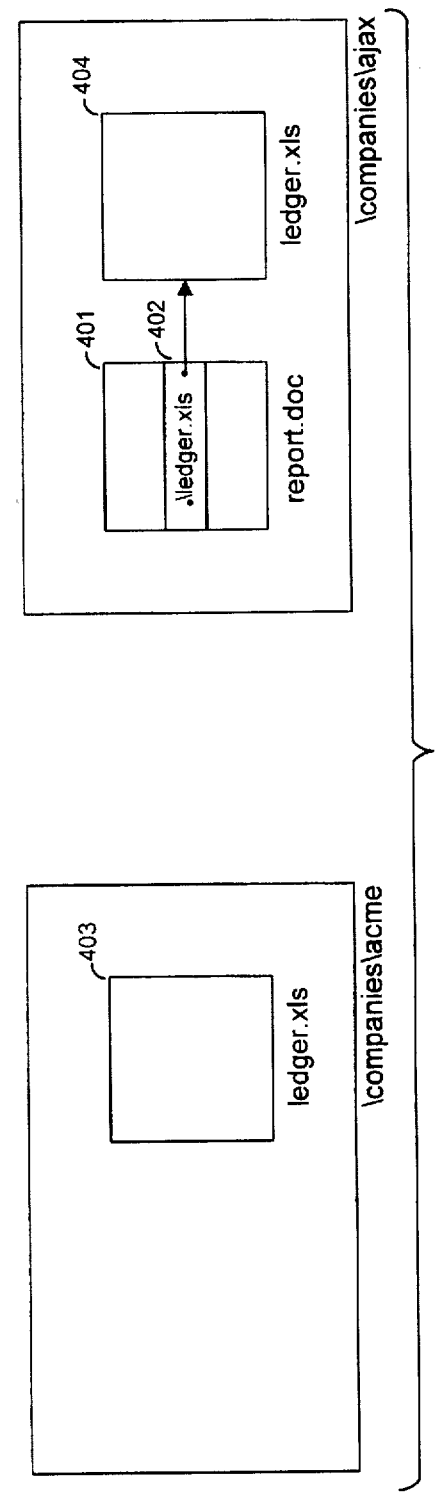
FIG. 4A
FIG. 4B
PRIOR ART

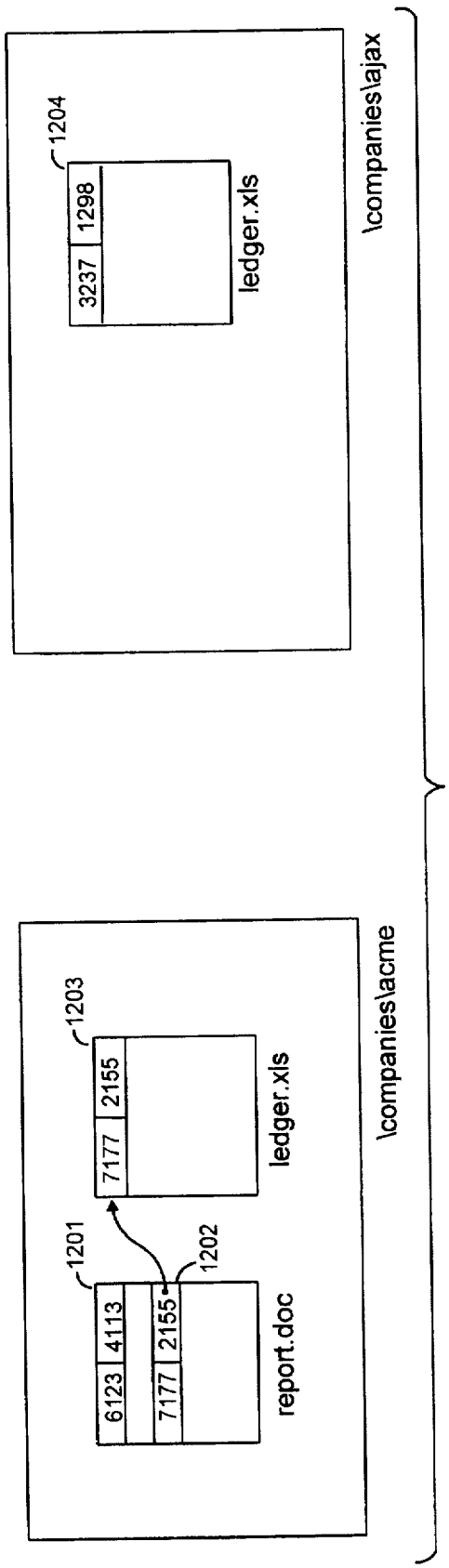
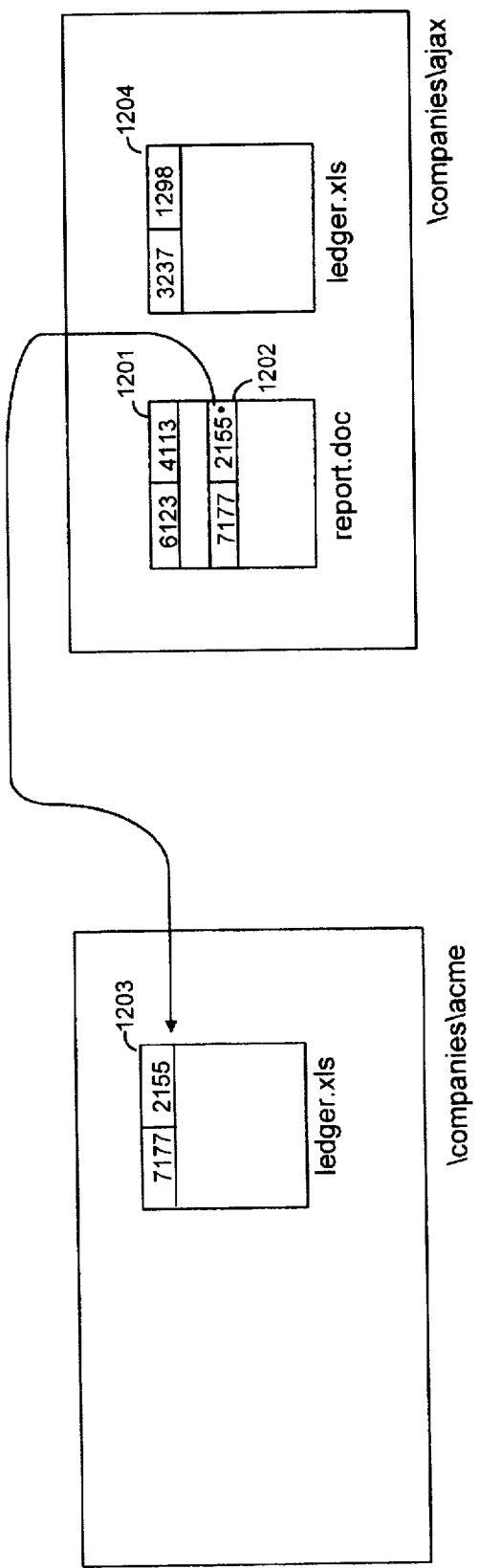
FIG. 12A
FIG. 12B

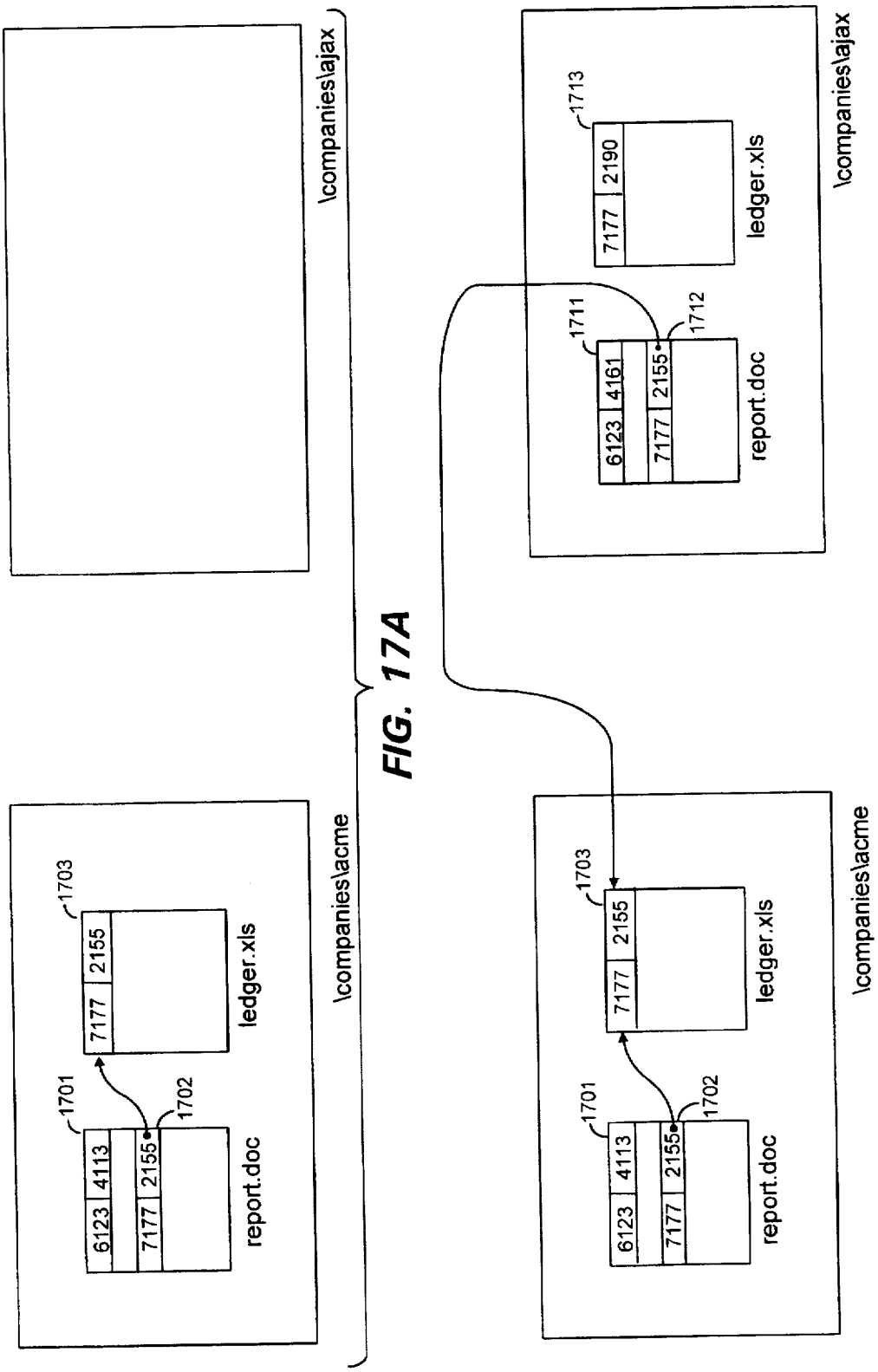

METHOD AND SYSTEM FOR THE LINK TRACKING OF OBJECTS

CROSS-REFERENCE TO RELATED APPLICATIONS

This application is a continuation-in-part of Ser. No. 08/085,186, filed Jun. 30, 1993, which is hereby incorporated by reference.

TECHNICAL FIELD

The invention relates generally to a computer method and system for tracking links to objects, and, more specifically, to a method and system for resolving links to objects.

BACKGROUND OF THE INVENTION

Computer systems are often used to compose, store, retrieve, and update objects containing information. An application program such as a word processor or a spreadsheet is usually employed to perform these activities. Typically, a user composes an object by using an application program to input all of the contents of the object, using an input device such as a keyboard. As an example, if a user were to compose a report object containing several introductory paragraphs of text, a numerical table, and several conclusion paragraphs of text, the user would typically use a keyboard to type the introductory paragraph, the numerical table, and the conclusion paragraphs.

To facilitate the inputting of the contents of an object, a user may copy information from an existing object into the object being composed. This copying method has the advantage that it allows a user to avoid re-inputting information that has already been input. For example, when a user composes a report object and a ledger object already exists that contains the numerical table, the user may copy the numerical table from the ledger object into the report object instead of retyping the numerical table.

The copying method has the disadvantage that, when the numerical table is copied to the report object from the ledger object, the object loses its association with the ledger object. If the ledger object is then changed, the numerical table in the report object does not automatically change.

This loss of association disadvantage can be overcome by the use of object links. An object link (link) is a reference to a source object that is stored in a client object. The computer system treats the link as if the current contents of the source object are incorporated in the client object. When a user accesses the client object, the computer system encounters the link and then locates and accesses the source object. Locating the source object of a link is called resolving the link. When links are used, the current version of the source object is incorporated in the client object. The client object therefore has the benefit of any updates to the source object, even if they occurred after the link was created.

As an example of the use of links, a user can link a ledger object containing a numerical table of sales information into a report object containing a textual description of the sales information. FIG. 1 is a diagram illustrating the use of a link. A report object 101 named report.doc contains a link 102 to a ledger object 103 named ledger.xls. When the report.doc object is displayed, the link to the ledger.xls object is resolved, allowing the contents of the ledger.xls object to be accessed and incorporated in the display 104. Here, the ledger.xls object is the source object and the report.doc object is the client object.

Each link contains information used to locate where the source object is stored. Objects may be persistently stored in a variety of organizations on various storage devices. For example, a hierarchical file system stores objects as files. A hierarchical file system is a file system in which a root directory can contain files and subdirectories. Any subdirectory may contain files and further subdirectories. Thus, successive levels of subdirectories that descend from the root directory form a hierarchy. A pathname describes a location in the hierarchy, and each pathname refers to a file or subdirectory. For example, the pathname "\dos\copy.exe" describes a file named "copy.exe" contained in a directory called "dos", which in turn is contained in the root directory. Hierarchical file systems typically store links as pathnames.

Pathnames are either absolute or relative. An absolute pathname contains information needed to locate a file with respect to the root directory. A relative pathname, on the other hand, contains information necessary to locate a file with respect to the location of some other file. A link containing a relative pathname specifies the location of the source object relative to location of the client object. When a source object is located in the same directory as the client object, the link contains the source object name prefaced by the characters ".\". Therefore, if the report.doc and ledger.xls objects were located in the same directory, the pathname in the link would be ".\ledger.xls". An absolute pathname is an ordered list of the subdirectories into which one must successively descend to reach the source object, beginning with the root directory. If the ledger.xls object is in a directory named "acme", which in turn is in a directory called "companies" which in turn is in the root directory, the absolute pathname of the ledger.xls object is "\companies\acme\ledger.xls".

FIG. 2 shows a conventional method for storing and resolving links. Client object 200 is a report object. It contains a link to a ledger object, which in turn contains the absolute pathname of the source object, "\companies\acme\ledger.xls". As described above, this absolute pathname specifies a location in a file system hierarchy. The file system hierarchy contains directories 220–226. Directory 226 is the \companies\acme directory, which contains the source object. Directory 230 is a detailed view of directory 226. It contains a mapping of file names for files contained in the \companies\acme directory to file system identifiers. A file system identifier uniquely identifies a file in the file system. For example, directory 30 maps filename "report.doc" to file system identifier "<fsid1>" and filename "ledger.xls" to file system identifier "<fsid2>". A file system identifier table 240 then maps each file system identifier to an access information block. Each access information block contains a list of the locations and the storage media, or "sectors" that contain the data that comprise a file. For example, the file system identifier table maps from the file system identifier "<fsid1>" to access information block 250 and from file system identifier "<fsid2>" to access information block 260. Access information block 260 contains a list of the sectors that comprise the source file. Access information block 260 contains three references to comprise reference 263, reference 264, and reference 265. These references refer to sectors 273, 274, and 275 of the media 270, respectively.

Operating systems typically include commands that allow a user to move or rename an object. In a system supporting links between objects, the move or rename commands can be expanded to update the pathname in any link that refers to the moved or renamed object. However, operating systems also provide copy and delete commands that a user may use to move and rename objects. A user may rename an object by copying the object into the same directory and deleting the copied-from object. A user may move an object by copying the object into a different directory and deleting the copied-from object. Any time a user employs the copy and delete commands to move or rename a source object, any links to the source object may become impossible to resolve.

FIGS. 3A–3C are block diagrams that illustrate the problem that occurs when the copy and delete commands are used to rename a source object. In FIG. 3A, the report.doc object 301 contains a link 302 to the ledger.xls object 303. The link uses a relative pathname to refer to the ledger.xls object. If the link were resolved at this point, it would resolve correctly to the ledger.xls object. In FIG. 3B, the report.doc object, the ledger.xls object, and the link are unchanged. However the ledger.xls object has been copied to a growth.xls object 304. At this point, the link would still resolve to the ledger.xls object, because it still contains the pathname referring to the ledger.xls object. In FIG. 3C, the ledger.xls object has been deleted. Since the link still refers to the nonexistent ledger.xls object, the link cannot be resolved. At this point, a resolution of the link would fail, even though the growth.xls object is intended to be the renamed ledger.xls object. Any time a user employs the copy and delete commands to move or rename a source object, any links to the source object may become impossible to resolve.

Another situation in which links to source objects resolve incorrectly occurs when the object containing the link is moved to a different directory. FIGS. 4A–4B are block diagrams that illustrate the problem that occurs when the copy and delete commands are used to move a source object. FIG. 4A shows a report.doc object 401 containing a link 402 to a source ledger.xls object 403. The report.doc and ledger.xls objects are contained in a "\companies\acme" directory. A "\companies\ajax" directory contains a different but like-named ledger.xls object 404. While the report.doc object is in the "\companies\acme" directory, the link resolves correctly to the ledger.xls object 103. FIG. 4B shows the report.doc object moved to the "\companies\ajax" directory. When the report.doc object is in the "\companies\ajax" directory, the link resolves incorrectly to the ledger.xls object 404. A similar problem occurs when any object containing a link is moved such that the pathname stored in its link fails to describe any object or describes the wrong object.

In some computer systems that support linking, links each contain an object identifier instead of a pathname. A locator table is used to map the object identifier into a pathname. The level of indirection added by the locator table streamlines the process of updating the links to a source object that has been moved or renamed. No matter how many links to the source object exist, they can all be updated by merely changing the pathname once in the locator table. FIG. 5 is a block diagram that illustrates the implementation of a locator table. A locator table 501 contains object identifiers 511–514 which correspond to source object pathnames 521–524, respectively. Source objects 531–534 each contain a unique object identifier 541–544, respectively. Since the locator table contains entries for objects in many different directories, absolute pathnames are used. When a source object is linked to, its object identifier is copied into the link. The object with object identifier "1112" contains a link 551 to the object with object identifier "1111". If object 531, having object identifier "1111", was moved or renamed, the link could be preserved by changing pathname 521 to correctly reflect the new name or location of object 531.

While the use of a locator table improves efficiency, it introduces a new problem with maintaining links. In order to prevent the loss of objects in cases of media failure or unintentional deletion, original objects are often copied from a primary storage device (e.g., a hard disk) to an archival storage device (e.g., a floppy disk). This copying is called archiving and the object produced by the copying is called an archived object. If any original object that has been archived is corrupted or erased, the corresponding archived object can be copied back to the primary storage device. This copying is called restoring the object, and the object produced by the copying is called a restored object. Restored objects usually replace the corrupted or deleted object on the primary storage device. However, because a user can move or change the name of an original object, restoring an object may result in having two copies of the same object on the primary storage device. Similarly, the user can specify to restore the object to a different directory, also resulting in having two copies of the same object on the primary storage device. Both copies share the same object identifier, but may have separate entries in the locator table. Since two entries may exist in the locator table for the same object identifier, the mapping from that object identifier to a pathname may be ambiguous. As a result, a link containing the duplicated object identifier may be resolved to either the original object or the restored object. Though the ambiguity is of little concern when the original object and the restored object are exact copies of one another, when either object is changed, it is essential that the correct object is chosen when resolving a link to their shared object identifier.

For example, if the object 531, having object identifier "1111", was archived from the "\companies\acme" directory, then restored to the "\companies\directory", a new entry (not shown) would be created in the locator table containing the object identifier "1111" and the pathname "\companies\ledger.xls". When the link in the 532 object is resolved, it may resolve to either the original object having the object identifier "1111" or the restored object having object identifier "1111", depending upon which of the corresponding locator table entries is encountered first when searching the table for an entry with object identifier "1111". If the objects remain exact copies, then it is unimportant which one the link resolves to. However, if the original object is edited to include more information, when the link resolves to the restored object, the information added by editing the original object would not be incorporated in the client object.

Source objects originally stored on a storage device of a computer system that is connected to one or more other computer systems by a network can easily be moved by a user to a storage device of any other connected computer system. If a source object is not found by any of the above-described methods, it is common for the program searching for the source object to "broadcast" a request to each connected computer system to search for the source object on its storage devices and report back the results. While this "exhaustive search" approach is certain to effectively locate the source object if it is identifiable and stored on a storage device of a connected computer system, exhaustive searching is very expensive, in that it takes significant processing and storage retrieval resources for each connected computer system to search the full contents of each of its storage devices, and extensive network communications resources to broadcast the request and collect the results.

SUMMARY OF THE INVENTION

It is a goal of the invention to provide a method and system for establishing a link to a source object that may be resolved to objects that derive from the same object creation as the source object.

It is another goal of the invention to provide a method and system for tracking objects that derive from a common object creation.

It is yet another goal of the invention to provide a method and system for resolving a link to an object that derives from the same object creation as the source object.

It is a further goal of the invention to provide a method and system for searching accessible storage volumes for an object that is the source object of a link.

These and other goals, which will become apparent as the invention is more fully described below, are provided by a method and system for tracking, and resolving links to, objects that derive from a common object creation. In a preferred embodiment, the system creates a source object. The system then generates a lineage identifier to identify the creation of the source object. Then the system associates the lineage identifier with the source object. In a preferred embodiment, the system only associates the lineage identifier with the source object when a link to the source object is created. At a later time, the system copies the created object to a copy object. When the source object is copied to a copy object, the system associates the lineage identifier associated with the source object with the copy object. In this way, the lineage identifier associated with the copy object indicates that the copy object derives from the creation of the source object. The system is also preferably able to detect when a user has effectively moved a source object without expressly using a move command, and associate with the effectively moved object the lineage and distinguished identifier associated with the original object.

The system links a client object to a source object by storing a link containing the source object's lineage identifier in the client object. A link also contains information for distinguishing the source object from other objects having the same lineage identifier. When resolving the link to the source object, the system selects the lineage identifier and the distinguishing information contained in the link. The system then searches for an object with the selected lineage identifier and distinguishing information. When an object with the selected lineage identifier and distinguishing information is found, the system resolves the link to the found object. When an object with the selected lineage identifier and distinguishing information is not found, the system searches for an object with the selected lineage identifier without regard to the selected distinguishing information. When an object with the selected lineage identifier is found, the link system resolves the link to this found object.

When resolving a link, the system preferably searches for the source object of the link in a series of volumes in an optimal order. The system preferably first checks a pathname stored in the link, then searches a hinted volume, then searches all local volumes, then searches volumes in an automatic volume list, then searches volumes in a manual volume list, then searches volumes in remote volume lists indicated by a list of remote volume lists, then broadcasts a search request to all connected machines. The system preferably also implements an object identifier table that maps from object identifiers used in links directly to file system identifiers, thereby bypassing the step of looking up a source object file name in a directory specified by a pathname.

BRIEF DESCRIPTION OF THE DRAWINGS

FIGS. 4A–4B are block diagrams that illustrate the problem that occurs when the copy and delete commands are used to move a source object.

FIGS. 12A–12B are block diagrams that illustrate how the facility overcomes the problem of moving an object containing a link to a different directory.

FIGS. 17A–17B show the problem introduced by using the object group copy command to copy both a client object and the object that is the source of the link in the client object.

DETAILED DESCRIPTION OF THE INVENTION

Figure 1:
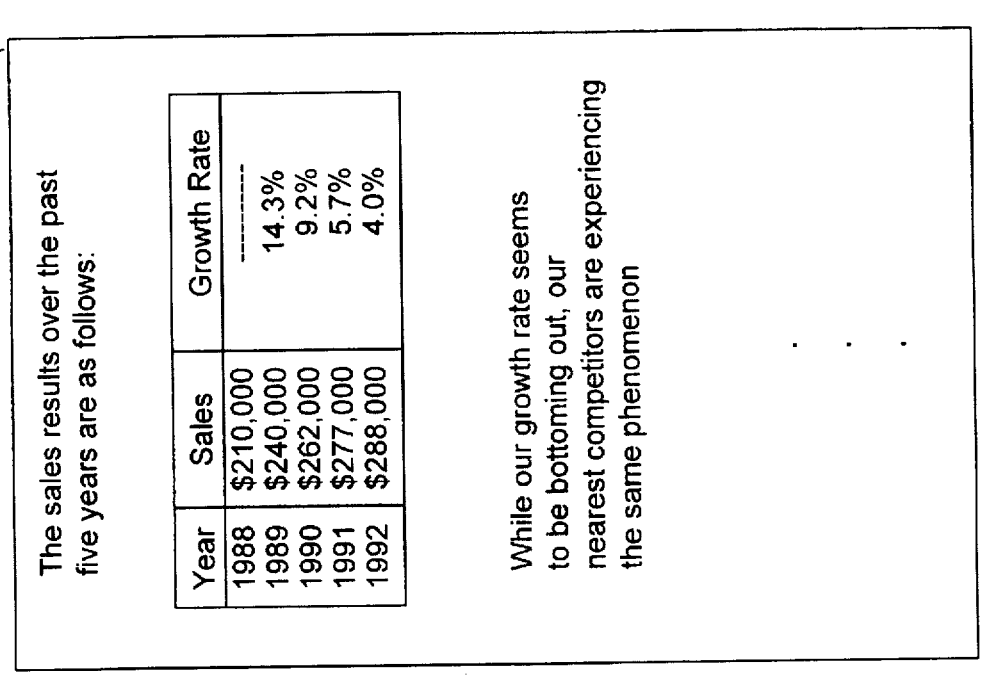
FIG. 1 is a illustrating the use of a link.
Figure 2:
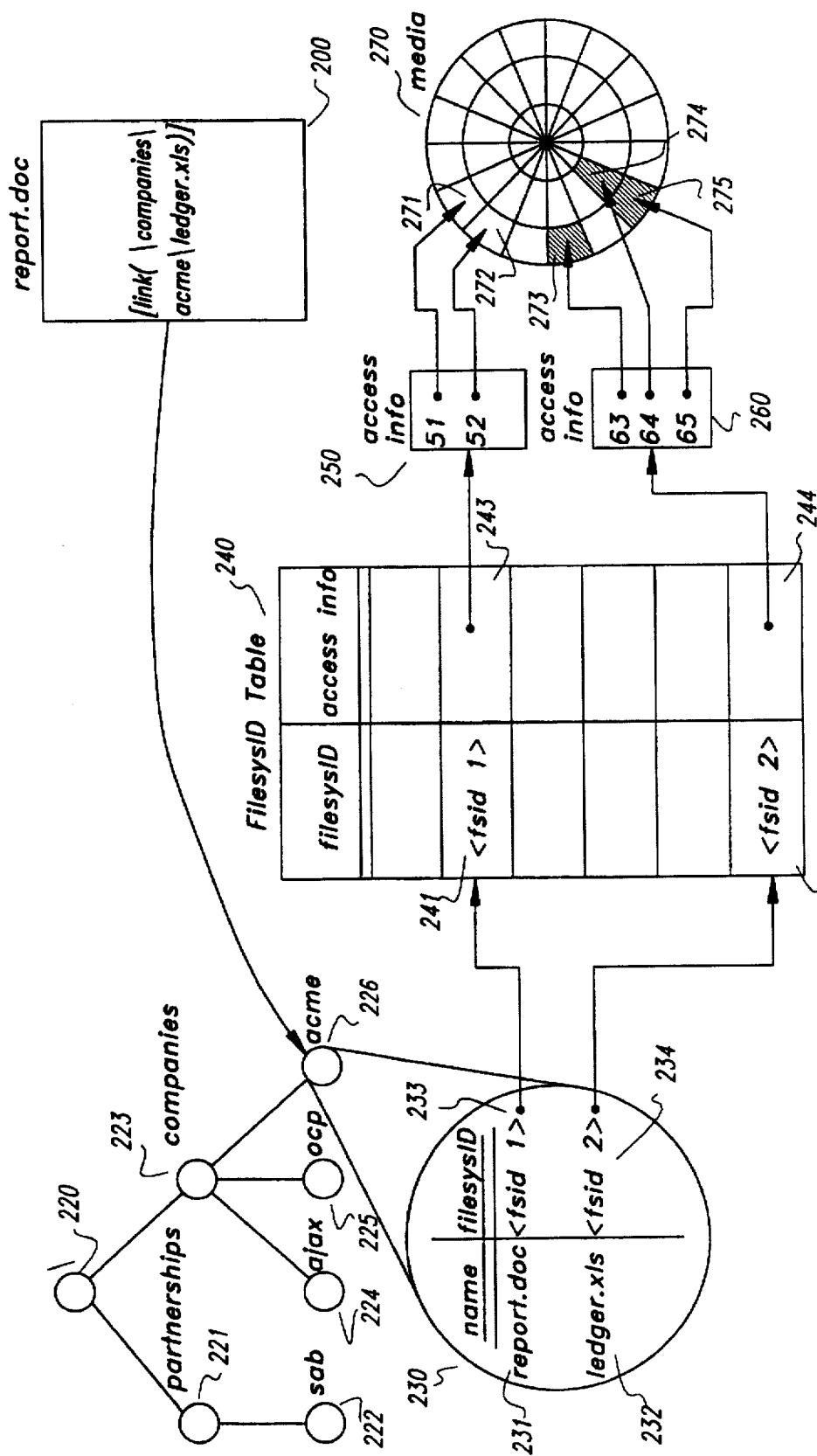
FIG. 2 shows a conventional method for storing and resolving links.
Figure 3A:
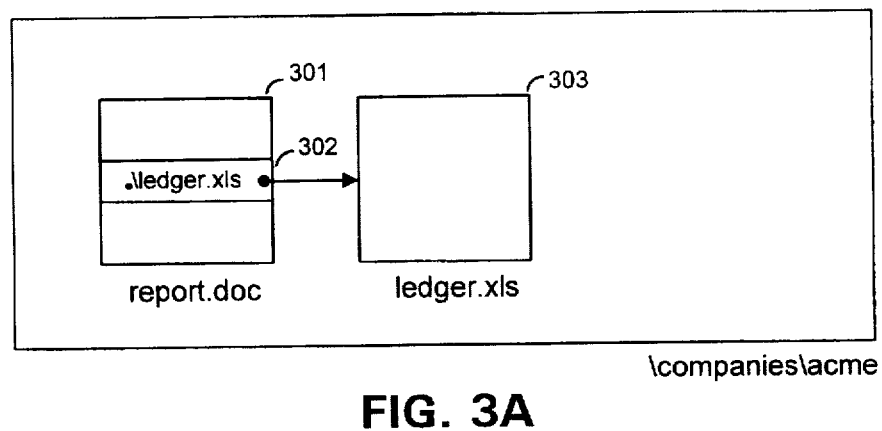
FIGS. 3A–3C are block diagrams that illustrate the problem that occurs when the copy and delete commands are used to rename a source object.
Figure 3B:
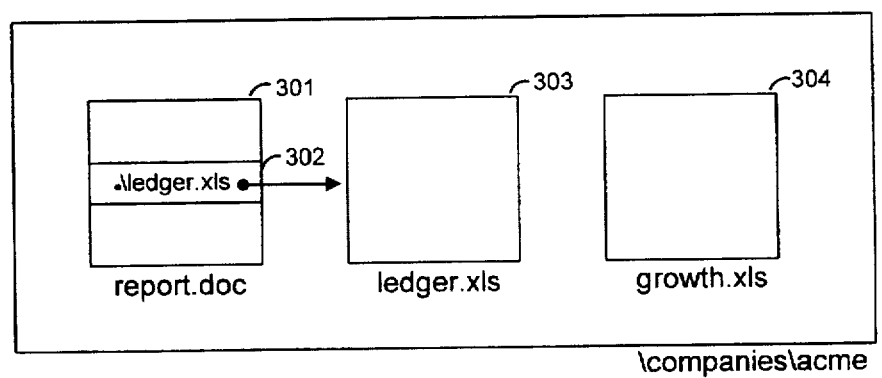
Figure 3C:
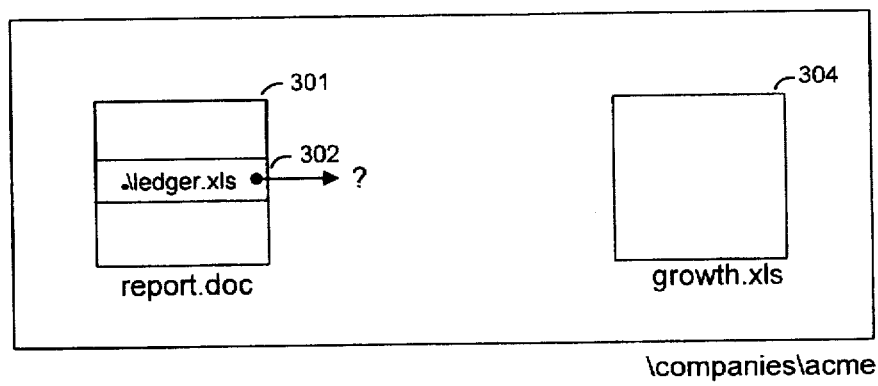
Figure 5:
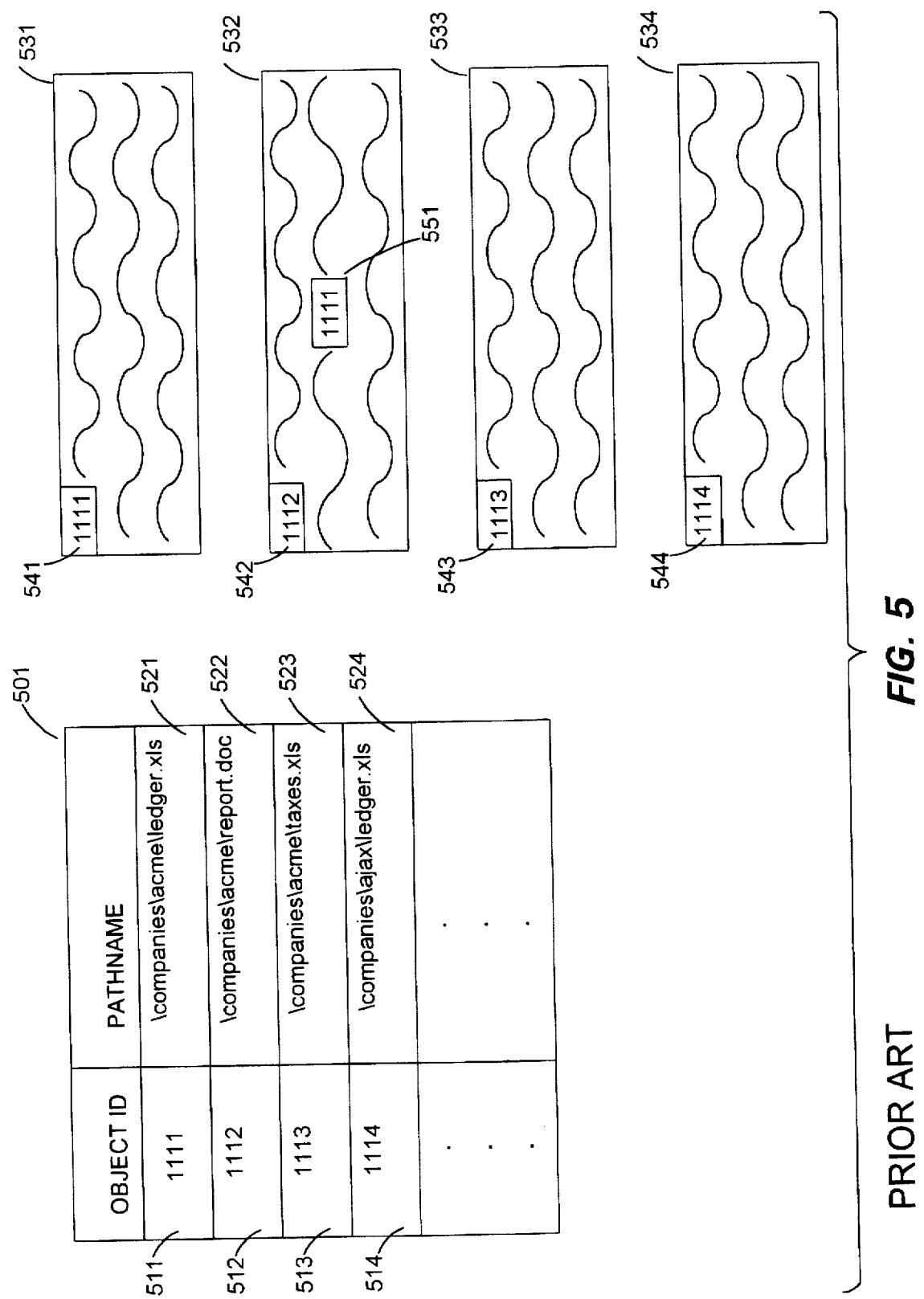
FIG. 5 is a block diagram that illustrates the implementation of a locator table.

A preferred embodiment of the invention is a software-based object linking facility (facility) for tracking, and resolving links to, objects in a computer system. The facility assigns to each object that is the source of a link an object identifier comprising two components: a lineage identifier and a distinguished identifier. An object can come into existence in two distinct ways: it can either be created from scratch, or copied from an existing object. When an object is created, it is assigned an object identifier comprising a preferably unique lineage identifier, and a distinguished identifier. When an object is copied, the copy object is assigned a preferably unique object identifier comprising the same lineage identifier as the copied from (original) object and is assigned a distinguished identifier that is different from the distinguished identifier of every other object identifier with the same lineage identifier. When the facility establishes a link to a source object, it stores the object identifier of the source object in the link. If, when a link is resolved, the original source object is still accessible, the facility locates the original source object by searching for an object with the lineage identifier and the distinguished identifier contained in the link. If the original source object is inaccessible, e.g., has been deleted, the facility can find the copy of the original source object by searching for an object with the lineage identifier contained in the link, without regard to the selected distinguishing identifier. The facility also preferably detects situations in which the user intends the source of a link to change from a first source object to a second source object, and automatically transfers the entire object identifier from the first source object to the second source object. These situations include when the user uses copy and delete commands to effectively move the source object and when the user uses a typical application program to save a revised version of the source object. Similiarly, when the user copies a group of objects that contains both a (for latter case, only lineage identifier copied: a new distinguished id is used.) and the source of the link.

In an alternate embodiment, instead of containing a lineage identifier and a distinguished identifier, object identifiers each contain a lineage identifier and a series of copy identifiers. In this embodiment, the facility assigns a lineage identifier to an object when it is created, then assigns a copy identifier to the object each time the object is copied. The copy identifiers act as distinguishing identifiers, distinguishing between objects that share the same creation. This embodiment also adds information about the specific heritage of an object. This allows the facility to differentiate between ancestors and descendants of an object whose object identifier is known. As such, when resolving a link for which the original source object is not available, the facility can give preference to resolving to an object that is a descendant, especially a near descendant, of the original source object.

It is desirable that the facility is able to resolve links efficiently. To this end, the facility preferably stores all of the object identifiers for the objects stored in a volume (e.g., disk drive) in an object identifier table that maps each to the location of the corresponding source object. During resolution, the facility uses the object identifier table to reference the source object directly, without searching the file system in which source objects are stored. The facility also monitors connections to remote volumes to maintain a list of remote volumes likely to contain source objects for use in resolving links. The facility further prevents a source object's identifier from being dissociated from it when the source object is updated by maintaining a "short-lived" list of objects that are copied and then deleted, and by assigning the identifier of the deleted original object to the copy. Still further, the facility uses an optimal search strategy to locate source objects stored on other volumes than the volume on which the client object is stored. According to the strategy, the facility first searches the directory designated by a relative path stored in the link that describes the location of the source object relative to the location of the client object. The facility then searches the volume that contained the source object the last time the link was resolved.

Figure 6:
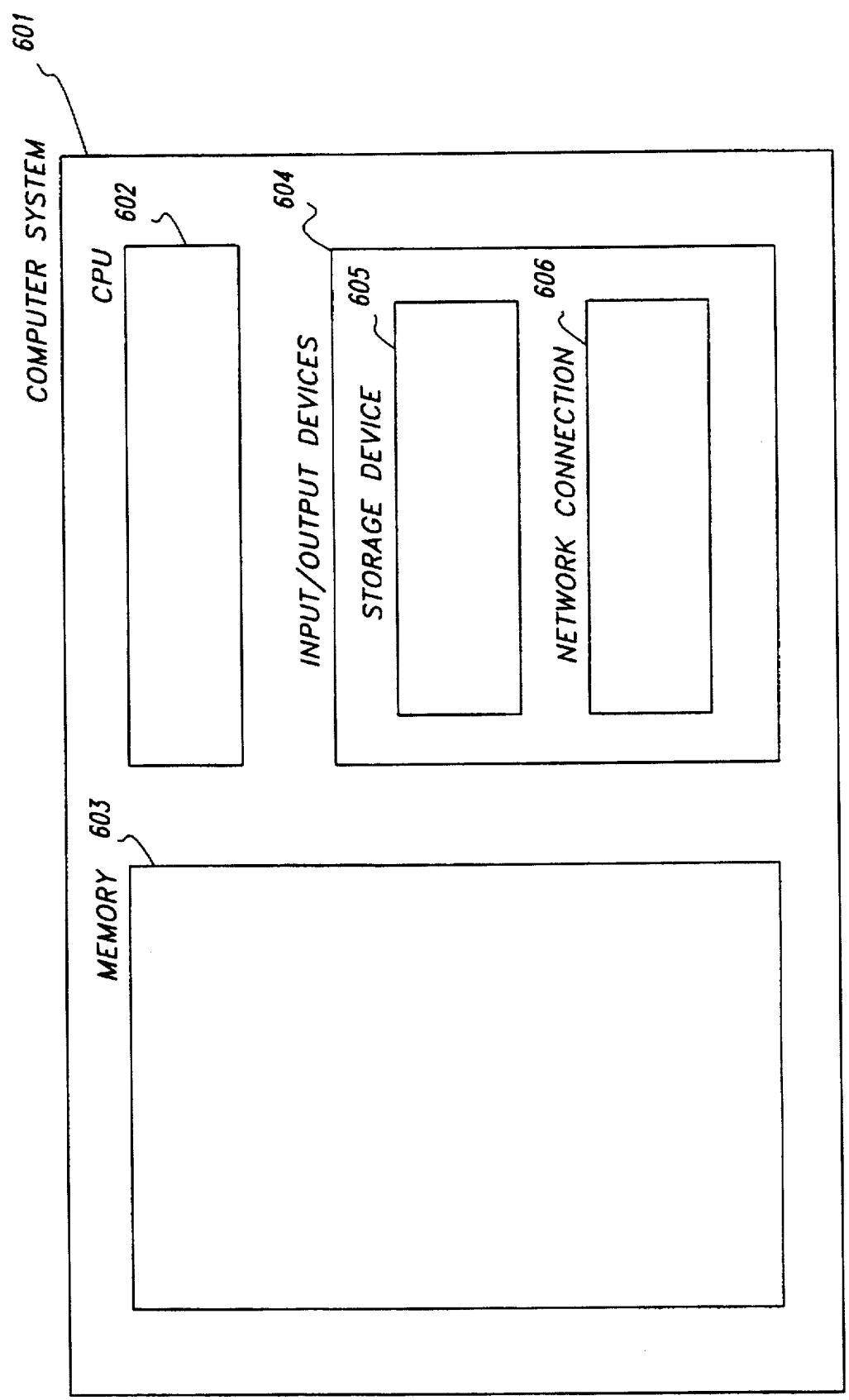
FIG. 6 is a high-level block diagram of the general-purpose computer system within which the facility preferably operates.

FIG. 6 is a high-level block diagram of the general-purpose computer system within which the facility preferably operates. The computer system 601 contains a central processing unit (CPU) 602, a computer memory (memory) 603, and input/output devices 604. Among the input/output devices are a storage device 605, such as a hard disk drives and a network connection 606. Objects can reside either in the memory or the storage device. Objects can further be copied, moved or accessed between computer systems via the network connection.

When an object is created from scratch, the facility assigns it a new lineage identifier and a new distinguished identifier. The lineage identifier is intended to reflect which objects derive from the same creation, that is, which objects are copies of the created object, and copies of those copied objects, and so forth. In a preferred embodiment, a lineage identifier is a 16-byte number. A new lineage identifier is preferably generated by encoding date, time, and computer system identity information. This is an effective way to make the lineage identifier unique, as it is usually impossible to create two objects on the same computer system at exactly the same date and time, so long as the representation of time used is sufficiently precise. Copy identifiers are preferably generated in the same way. The distinguished identifier is intended to distinguish objects having the same lineage identifier, that is, objects that derive from the same creation. In a preferred embodiment, a distinguished identifier is a four-byte number. While a larger number may be used as a distinguished identifier, four-byte numbers have been found to be an effective tradeoff between capacity of the distinguished identifier to distinguish copies of an object and the consumption of storage resources in order to store the distinguished identifier. Because the number of copies made of an object is typically relatively small, it is not necessary for a distinguished identifier to have an extremely large capacity to distinguish copies of the same object. A new distinguished identifier is preferably generated by selecting a random number. Alternately, a new distinguished identifier is generated by the use of a running counter system. As discussed further below, in order to limit the number of object identifiers in use, which each consume additional storage, an object identifier is preferably created for and associated with an object the first time a link is created to the object.

When an object is copied, the facility assigns to the copy object the lineage identifier of the original object, and a new distinguished identifier. The original object and the copy object are said to derive from a common object creation. The lineage identifier shows that the objects are related, and the distinguished identifier is used to differentiate the objects. When an object is archived, then restored, it is considered to have been copied and the facility assigns it a new distinguished identifier. When an object is moved or renamed, both its lineage identifier and its distinguished identifier remain the same.

When the facility generates an object identifier (including a lineage identifier and a distinguished identifier) for an object, it associates that object identifier with the object so that (a) when a user decides to establish a link to the object, the facility can establish a link containing the object identifier; and (b) the facility can search for objects having a certain object identifier when resolving the link. In a preferred embodiment, when the facility associates an object identifier with an object, it stores the object identifier inside the object. In this way, the object knows its own object identifier. The facility preferably establishes an object identifier table that maps object identifiers to the pathnames of the associated objects. When an object identifier is generated for an object, the facility updates the object identifier table to include a mapping of that object identifier to the pathname of the object. If the user moves or renames the object, the facility updates the pathname stored in the object identifier table. Storing the object identifiers in a table permits the facility to quickly search for objects.

Figure 7:
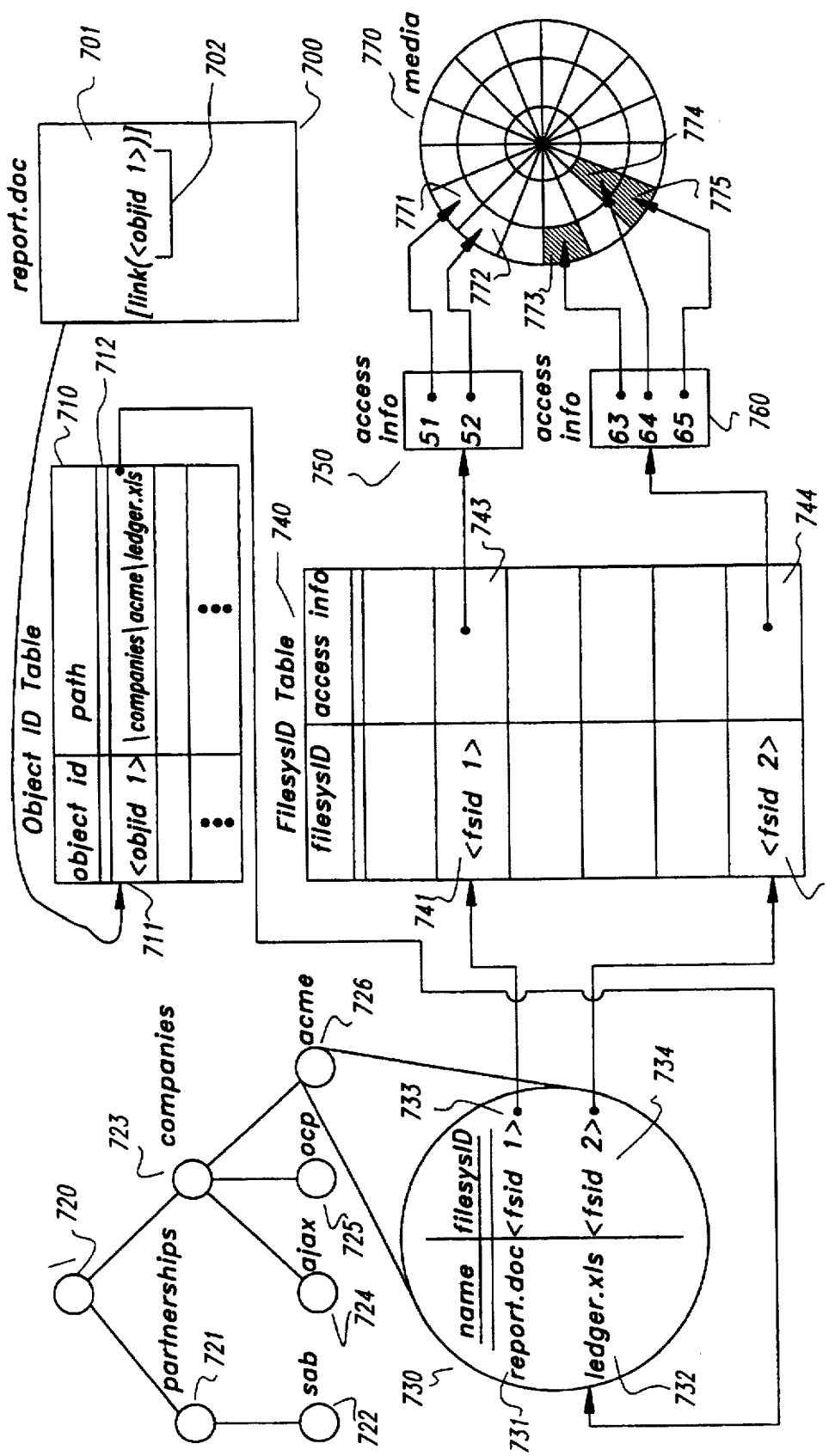
FIG. 7 is an overview diagram showing an implementation of the object identifier table in each object identifiers are mapped to object pathnames.

FIG. 7 is an overview diagram showing an implementation of the object identifier table in which object identifiers are mapped to object pathnames. The diagram shows a report.doc client object 700, containing a link 701 to a ledger.xls source object. The link contains an object identifier 702 ("<objid1>") uniquely identifying the source object. The diagram further shows an object identifier table 710, which maps object identifiers to file pathnames. When the facility attempts to resolve the link 701, it reads the object identifier table to determine that the object identifier "<objid1>" 711 maps to the path "\companies\acme\ledger.xls" 712. The diagram further shows a file system hierarchy composed of root directory 720 and other directories 721–726. The path 712 for the source object specifies the "\companies\acme" directory 726, which is shown in detail as directory 730. Directory 730 comprises a mapping of filenames to file system identifiers, which are then mapped by a file system identifier table 740 to access information blocks containing access information that permits the object to be read from the media 770 of the volume. For example, a "report.doc" filename 731 is mapped to a file system identifier 733 ("<fsid1>"), and the "ledger.xls" filename, corresponding to the source object, is mapped to a file system identifier 734 ("<fsid2>"). The file system identifier table 740 maps from file system identifiers to access information blocks. For example, file system identifier 741 ("<fsid1>") is mapped to access information block 750, which indicates that the corresponding object occupies sectors 771 and 772 of the media 770. Similarly, file system identifier 742 ("<fsid2>") is mapped to access information block 60, which indicates that the source object occupies sectors 773, 774, and 775 of the media 770. The source object can then be retrieved, and the link fully resolved, by retrieving sectors 773,774, and 775.

Figure 8:
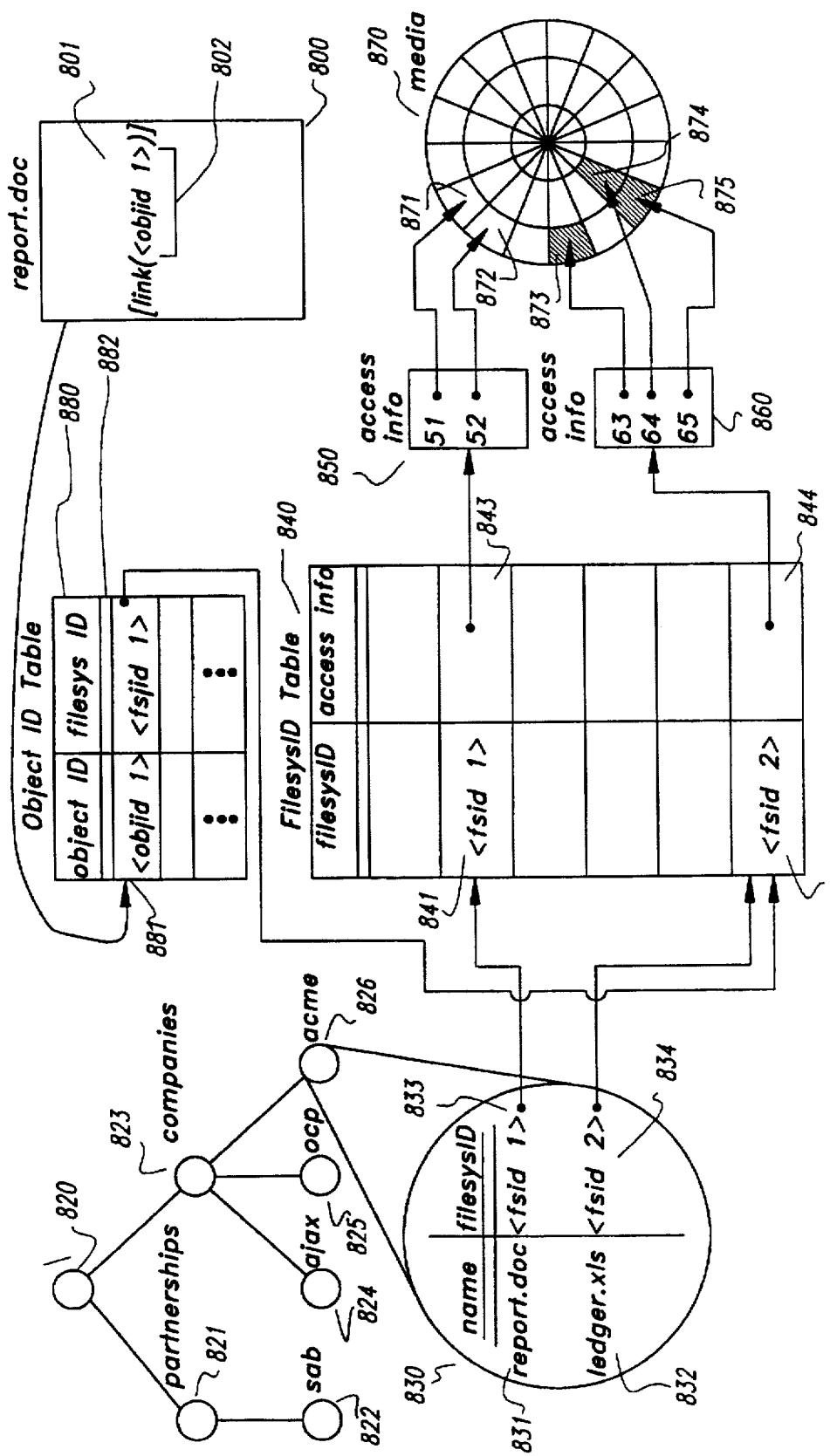
FIG. 8 is an overview diagram showing an implementation of the object identifier table in which object identifiers are mapped directly to file system identifiers.

In a preferred alternative embodiment, if the file system identifier table is exposed by the file system, it is more efficient for the facility to maintain and use an object identifier table that maps object identifiers directly to file system identifiers instead of to pathnames, thereby bypassing the step of looking up the filename in the directory specified by the pathname. FIG. 8 is an overview diagram showing an implementation of the object identifier table 880 in which object identifiers are mapped directly to file system identifiers. In order to resolve the link 801 containing object identifier 802 ("<objid1>"), the facility looks up "<objid1>" in the object identifier table 880. This object identifier is mapped to file system identifier "<fsid2>" 882, so the facility looks up the file system identifier "<fsid2>" in the file system identifier table 840. The file system identifier "<fsid2>" maps to access information block 860, which indicates that the source object occupies sectors 873, 874, and 875 of the media 870. The source object can then be retrieved, and the link fully resolved, by retrieving sectors 873, 874, and 875.

In a hybrid file system, the file system identifier for each source object is available for storage in the object identifier table, but no mechanism for retrieving sectors corresponding to a source object exists that identifies the source object to be retrieved using its file system identifier. Instead, the only mechanism for retrieving sectors corresponding to a source object is a file system service for retrieving an object that uses an absolute pathname to identify the object to be retrieved. In such a hybrid file system, the facility preferably uses the file system identifier to determine the absolute pathname of the source object to be retrieved, which the facility then uses to invoke the file system service for retrieving an object. The facility uses the file system identifier to determine both the identity of the directory in which the source object is located (e.g., directory 726/730) and the filename of the source object (e.g., "ledger.xls"). The facility then starts at that directory and "walks up" the directory hierarchy until it reaches the root node 720, prepending the filename with each directory name to eventually form the absolute path.

An object may be stored on a volume. A volume is either a particular storage device or a partition of a particular storage device. Each volume has its own root directory and file system hierarchy. A computer system may have several volumes of its own, and further may have access to volumes of other computer systems through its network connector. In a preferred embodiment, the facility establishes a separate object identifier table for the objects contained in each volume. The table is preferably stored in the volume whose object identifiers it contains. This assures that the object identifier table is accessible if and only if the objects to which it refers are accessible. On the other hand, it is sometimes impossible to store the object identifier table in the volume whose object identifiers it contains. A facility may be unable to write to certain volumes, for example, because the volume is read-only or full. The object identifier table for such volume may be stored in another volume.

In an alternate preferred embodiment, the facility only adds an object identifier to the object identifier table when the associated object is first linked to. The facility may also suppress associating an object identifier with an object until the object is linked to for the first time. This has the advantage of eliminating the overhead of generating and storing an object identifier when the object identifier is never used, i.e., when the object is never linked to. However, this has the disadvantage of eliminating the ability of the facility to establish and resolve a link to some related objects. For example, if an object was first copied, then linked to, then deleted, the link could not be resolved to the copy object.

Each time the facility establishes a link to a source object, it copies the object identifier of the source object into the link. In a preferred embodiment, the facility also stores the source object's pathname, or at least its volume name, in the link. Even though this pathname or volume name may not be updated when the source object is moved, copied, or renamed, it can establish a starting point at which to search for an object.

Figure 9:
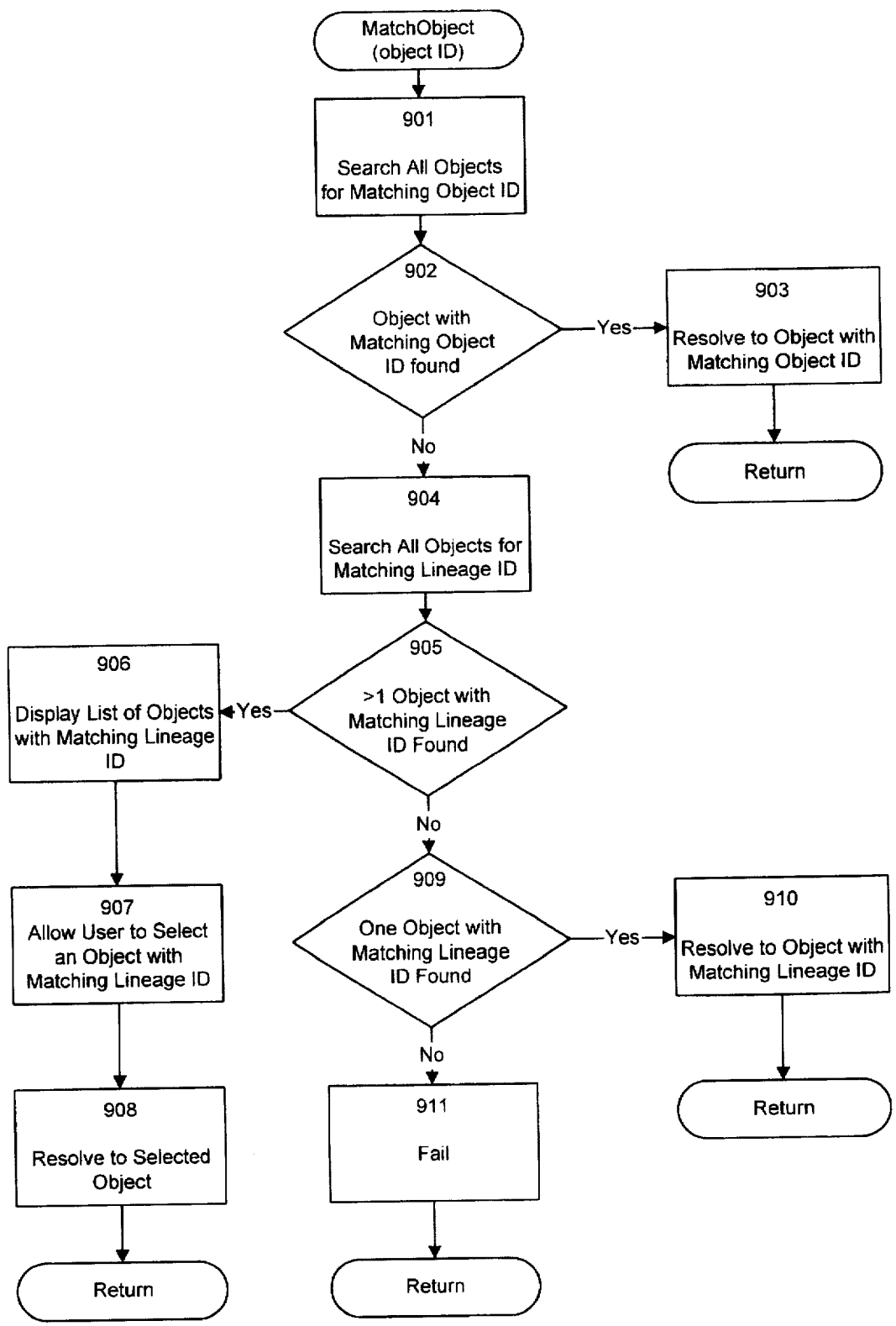
FIG. 9 is a flow diagram showing a first MatchObject subroutine for locating source objects.

FIG. 9 is a flow diagram showing a first MatchObject subroutine for locating source objects. The subroutine first searches for objects with matching entire object identifiers, then if necessary, searches for objects with matching lineage identifiers. The subroutine receives an object identifier as a parameter. When the facility calls the subroutine, it passes in the object identifier stored in the link that it is resolving. In step 901, the subroutine searches all objects for an object with a matching object identifier. This search will only find the original search object if it is still accessible. In step 902, if an object with a matching object identifier is found, then the subroutine continues at step 903, else the subroutine continues at step 904. In step 903, the subroutine resolves the link to the object with the matching object identifier. The subroutine then returns.

In step 904, the subroutine searches all objects for an object with a matching lineage identifier. This search finds any objects that derive from the same creation as the original source object. In step 905, if more than one object with a matching lineage identifier is found, then the subroutine continues at step 906, else the subroutine continues at step 909.

In steps 906 through 907, the subroutine allows the user to choose the related object to which the link should be resolved. In step 906, the subroutine displays a list of the objects with matching lineage identifiers. In step 907, the subroutine allows the user to select an object from the list. In step 908, the subroutine resolves the link to the object selected by the user. In steps 908 and 910, when a facility resolves the link to an object having the same lineage identifier and a different distinguished identifier, the facility preferably changes the distinguished identifier stored in the link to the distinguished identifier of the resolved-to object. This permits the facility to resolve the link to this object more easily the next time it is required to do so. The subroutine then returns.

In step 909, if an object with a matching lineage identifier was found, then the subroutine continues at step 910, else the subroutine continues at step 911. In step 910, the subroutine resolves the link to the object with the matching lineage identifier. The subroutine then returns. In step 911, the subroutine fails to resolve the link to any object, and returns. When the facility resolves a link to a particular object, it is also said to assign that object as the source object of the link.

Figure 10:
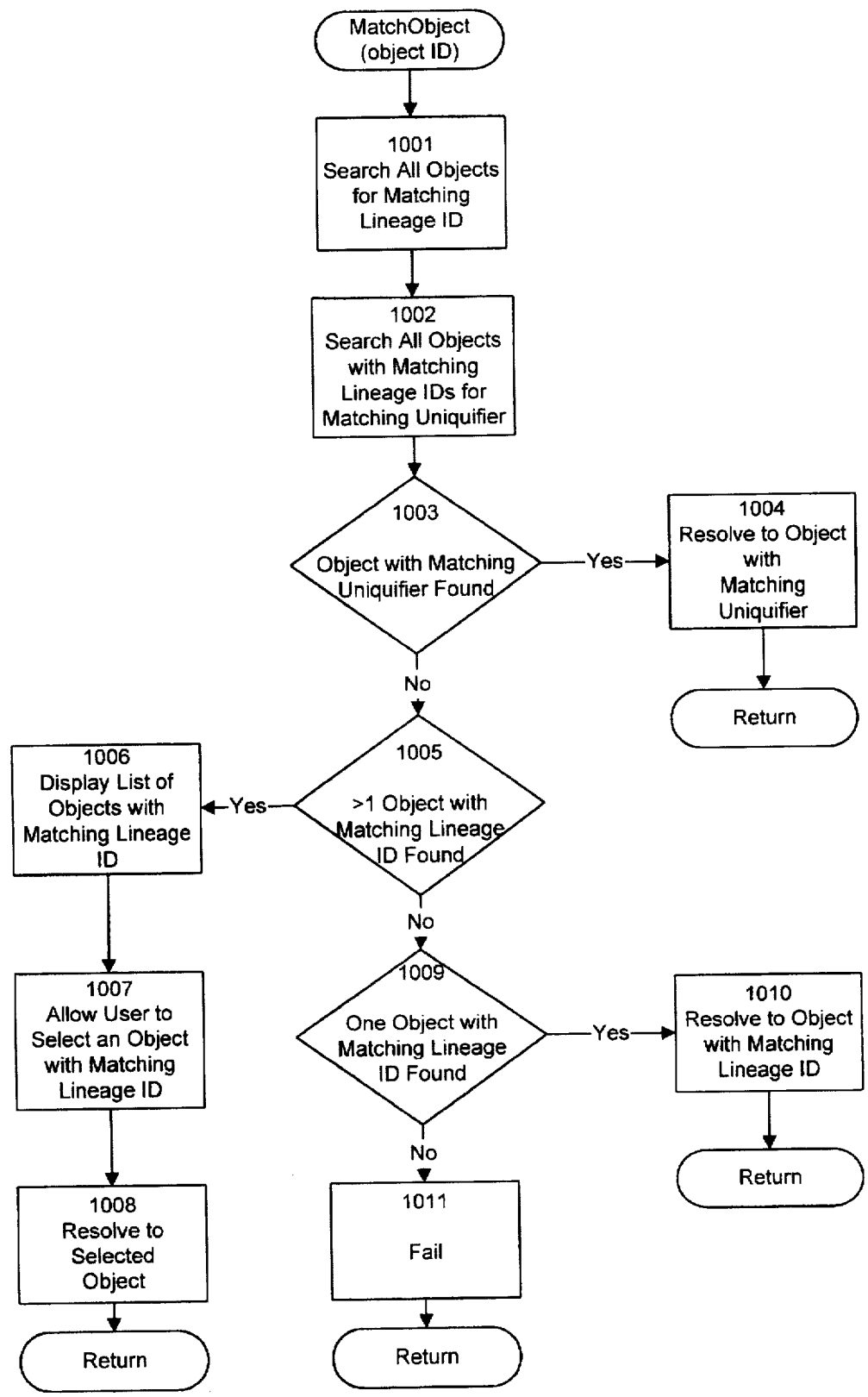
FIG. 10 is a flow diagram of a second MatchObject subroutine for locating source objects.

In an alternate embodiment, the facility calls a modified version of the MatchObject subroutine. FIG. 10 is a flow diagram of a second MatchObject subroutine for locating source objects. The modified subroutine proceeds by first searching for all objects having matching lineage identifiers, then searching among those objects for an object with matching distinguished identifier. The modified subroutine also receives an object identifier as a parameter.

In step 1001, the modified subroutine searches all objects for an object with a matching lineage identifier. In step 1002, the modified subroutine searches all of the objects found in step 1001 for an object with a matching distinguished identifier. In step 1003, if an object with a matching distinguished identifier was found, then the modified subroutine continues at step 1004, else the modified subroutine continues at step 1005. In step 1004, the modified subroutine resolves the link to the object with the matching distinguished identifier. This object is the original source object. The modified subroutine then returns.

In step 1005, if more than one object with a matching lineage identifier was found in step 1001, then the modified subroutine continues in step 1006, else the modified subroutine continues at step 1009. In steps 1006 through 1007, the modified subroutine allows the user to select an object with a matching lineage identifier to which to resolve the link. Objects with matching lineage identifiers are objects that derive from the same creation as the original source object. In step 1006, the modified subroutine displays a list of the objects with matching lineage identifiers. In step 1007, the modified subroutine allows a user to select an object from the list. In step 1008, the modified subroutine resolves the link to the object selected by the user. In steps 1008 and 1010, when a facility resolves the link to an object having the same lineage identifier and a different distinguished identifier, the facility preferably changes the distinguished identifier stored in the link to the distinguished identifier of the resolved-to object. This permits the facility to resolve the link to this object more easily the next time it is required to do so. The modified subroutine then returns.

In step 1009, if an object with a matching lineage identifier was found, then the modified subroutine continues at step 1010, else the modified subroutine continues at step 1011. In step 1010, the modified subroutine resolves the link to the object with the matching lineage identifier. This is an object related to the original source object. The modified subroutine then returns.

In step 1011, the modified subroutine fails to resolve the link to any object. The modified subroutine then returns.

Figure 11A:
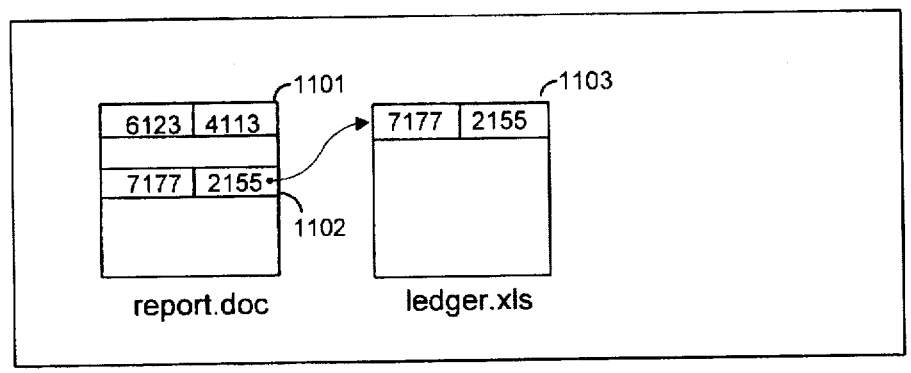
FIGS. 11A–11C block diagrams that illustrate how the facility overcomes the copy and delete problem.
Figure 11B:
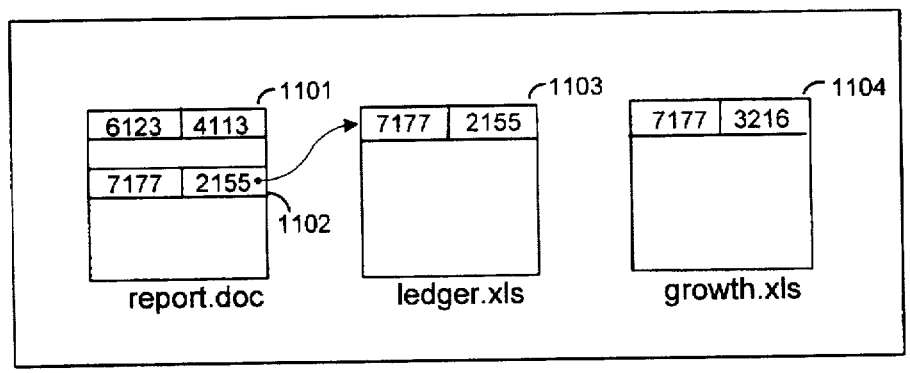
Figure 11C:
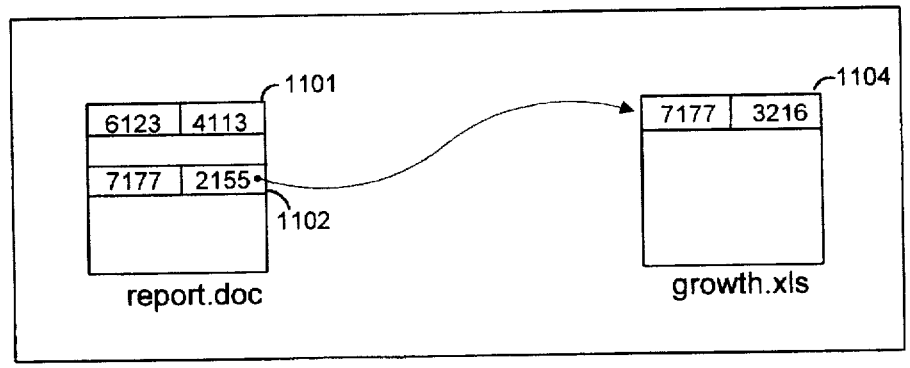

By using either MatchObject subroutine, the facility can overcome the problem that occurs when the copy and delete commands are used to move or rename a source object. FIGS. 11A–11C are block diagrams that illustrate how the facility overcomes the problem that occurs when the copy and delete commands are used to move or rename a source object. For purposes of this and later examples, both lineage identifiers and distinguished identifiers have been shortened to four decimal digits. In FIG. 11A, a report.doc object 1101 contains a link 1102 to a source object ledger.xls 1103. The link contains the lineage identifier of the ledger.xls object "7177" and the distinguished identifier of the ledger.xls object "2155". If the link were resolved at this time, the facility would first search for an object having the same lineage identifier and distinguished identifier as the link. The first search would find the ledger.xls object, and the facility would resolve to the ledger.xls object. FIG. 11B shows the report.doc and ledger.xls objects, and the link unchanged. A copy 1104 has been created of the ledger.xls object and named growth.xls. As a copy of the ledger.xls object, the growth.xls object keeps the same lineage identifier "7177" and receives a new distinguished identifier "3216". At this point, the link would still resolve to the ledger.xls object, as it has both the same lineage identifier and the same distinguished identifier as the link. In FIG. 11C, the ledger.xls object has been deleted. If the link were resolved at this point, the facility would first search for an object having the same lineage identifier and distinguished identifier as the link. Since such an object no longer exists, the first search would fail. The facility would then search for any object having the same lineage identifier as the link. This second search would find a growth.xls object, to which the link would be resolved. Because the facility can resolve to the growth.xls object in this situation, it is not subject to the copy and delete problem.

In a preferred embodiment, the facility implements a move recognition log to resolve the copy and delete problem even more efficiently. When the user makes a copy of an object, the facility stores an indication of the copy in the move recognition log, also called a short-term copy log. The indication of the copy stored in the log preferably includes the common lineage identifier of the original object and the copy object and the distinguished identifiers of the created object and the copy object. The log is a circular list having space for only a small number of entries. At any given time therefore, the log holds indications of only the last few copies performed by the user. When a user deletes an object, the facility searches the log for an indication that the deleted object was copied. If the log contains such an indication, the facility changes the distinguished identifier of the copy object to the distinguished identifier of the deleted object, causing all links established to the deleted object to resolve to the copy object. This embodiment permits the facility to resolve the copy and delete problem in many cases without using the facility's processing-intensive line-searching methods. Links, however, established to the copy objects between the copy operation and the deletion of the original object may become invalid.

The facility also overcomes the problem of moving a client object to a different directory. FIGS. 12A–12B are block diagrams that illustrate how the facility overcomes the problem of moving a client object to a different directory. FIG. 12A shows a report.doc object 1201 containing a link 1202 to a source ledger.xls object 1203. The link contains the ledger.xls object's lineage identifier "7177" and its distinguished identifier "2155". The report.doc and ledger.xls objects are contained in a "\companies\acme" directory. A "\companies\ajax" directory contains a different but like-named ledger.xls object 1204. Because it was created independently, the ledger.xls object in the "\companies\ajax" directory has a different lineage identifier and a different distinguished identifier than the ledger.xls object in the "\companies\acme" directory. If the link is resolved while the report.doc object is in the "\companies\acme" directory, the facility searches all the objects in the volume for one whose lineage identifier and distinguished identifier matches those in the link. This search finds the ledger.xls object in the "\companies\acme" directory. FIG. 12B shows the report.doc object's move to the "\companies\ajax" directory. If the link is resolved while the report.doc object is in the "\companies\ajax" directory, the facility searches all the objects in the volume for an object having the same lineage identifier and distinguished identifier as the link. As long as the "\companies\acme" directory is in the same volume as the "\companies\ajax" directory, the facility will find and resolve the link to the ledger.xls object and the "\companies\acme" directory. Since the facility can still correctly resolve a link after the object containing the link has been moved, the facility is not subject to the problem of moving a client object to a different directory.

Figure 13:
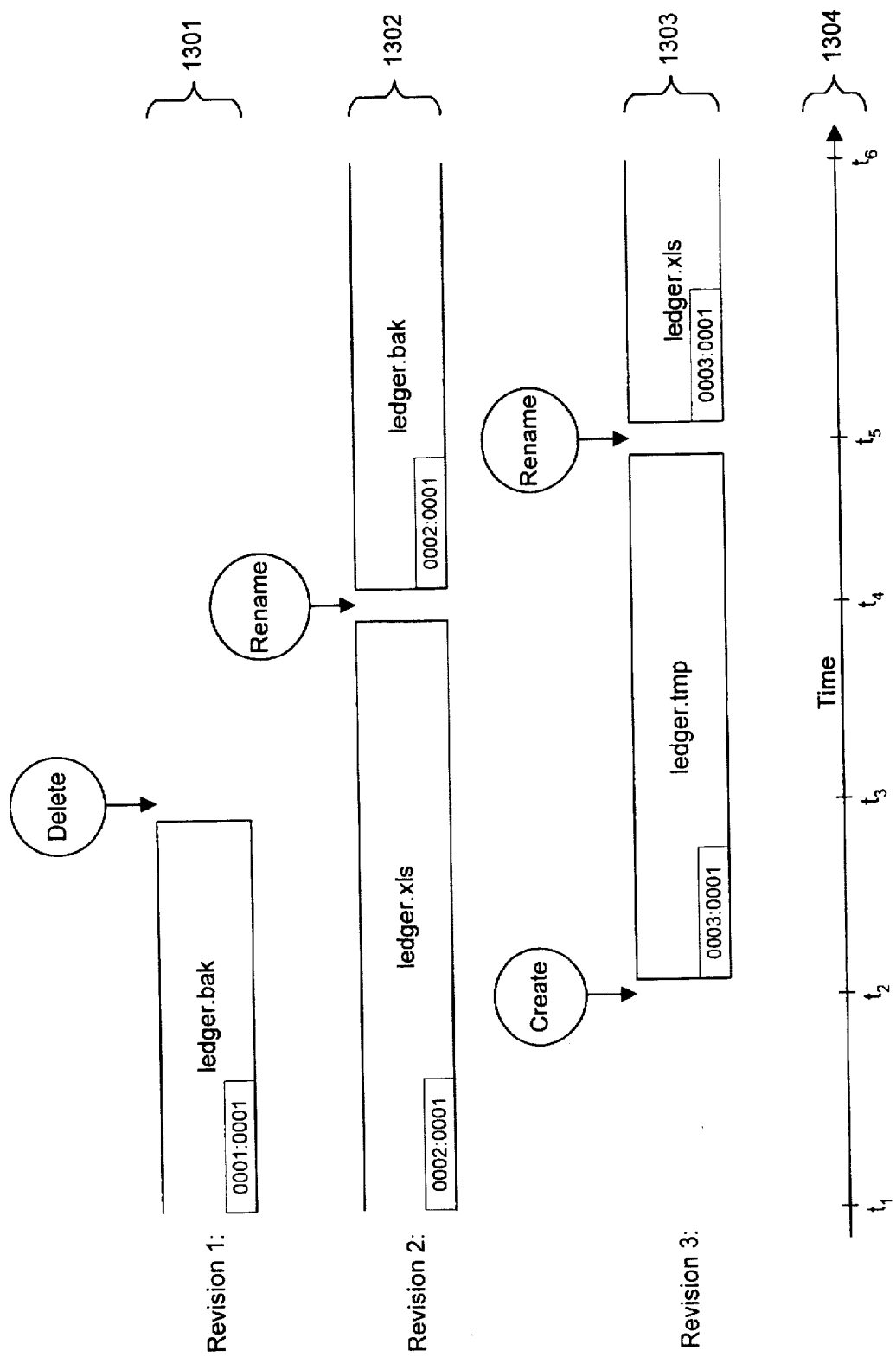
FIG. 13 is an object state timing diagram showing the process many application programs use to save a new revision of an object.

The facility further overcomes a link tracking problem caused by a process used by many application programs to save a new revision of an object. Instead of merely replacing the previous revision of an object with a current revision of the object, these applications store the current revision of the object in a temporary object, then rename the previous revision from a current object name to a backup object name and rename the temporary object from the temporary object name to the current object name. FIG. 13 is an object state timing diagram showing the process many application programs use to save a new revision of an object. The object state timing diagram shows the state of three objects 1301–1303, each corresponding to a successive revision of a ledger object created by an application program. These states are shown with respect to a time axis 1304, containing progressively later times $t_1$–$t_6$. At $t_1$, the Revision 1 and Revision 2 objects exist. The Revision 2 object has name "ledger.xls", object identifier "0002:0001", and is considered by the user to be the "current," or latest-saved, revision of the ledger object. The Revision 1 object has name "ledger.bak", object identifier "0001:0001", and is considered by the user to be the "backup," or second-latest-saved, revision of the ledger object. At $t_1$, the user creates a link to the current revision of the ledger object, Revision 2 (not shown). The link contains the object identifier for Revision 2, "0002:0001". At $t_2$, the application program begins the process of saving Revision 3, the latest revision of the ledger object. The application first creates the Revision 3 object. The Revision 3 object initially has temporary file name "ledger.tmp", and object identifier "0003:0001". At $t_3$, the application deletes the Revision 1 object. At $t_4$, the application renames the Revision 2 object "ledger.bak". The Revision 2 object's object identifier does not change. At $t_5$, the application renames the Revision 3 object "ledger.xls". The Revision 3 object's object identifier does not change. At this point, the Revision 3 object is the current revision of the ledger object, and the Revision 2 object is the backup revision of the ledger object. It is presumed that, in most cases, the user expects that a link to a source object will resolve to the current revision of the source object. However, if the link created at $t_1$ is resolved at 16, the link resolves to the Revision 2 (backup) object, since it has the object identifier stored in the link, instead of to the Revision 3 (current) object, which has a different object identifier.

Figure 14:
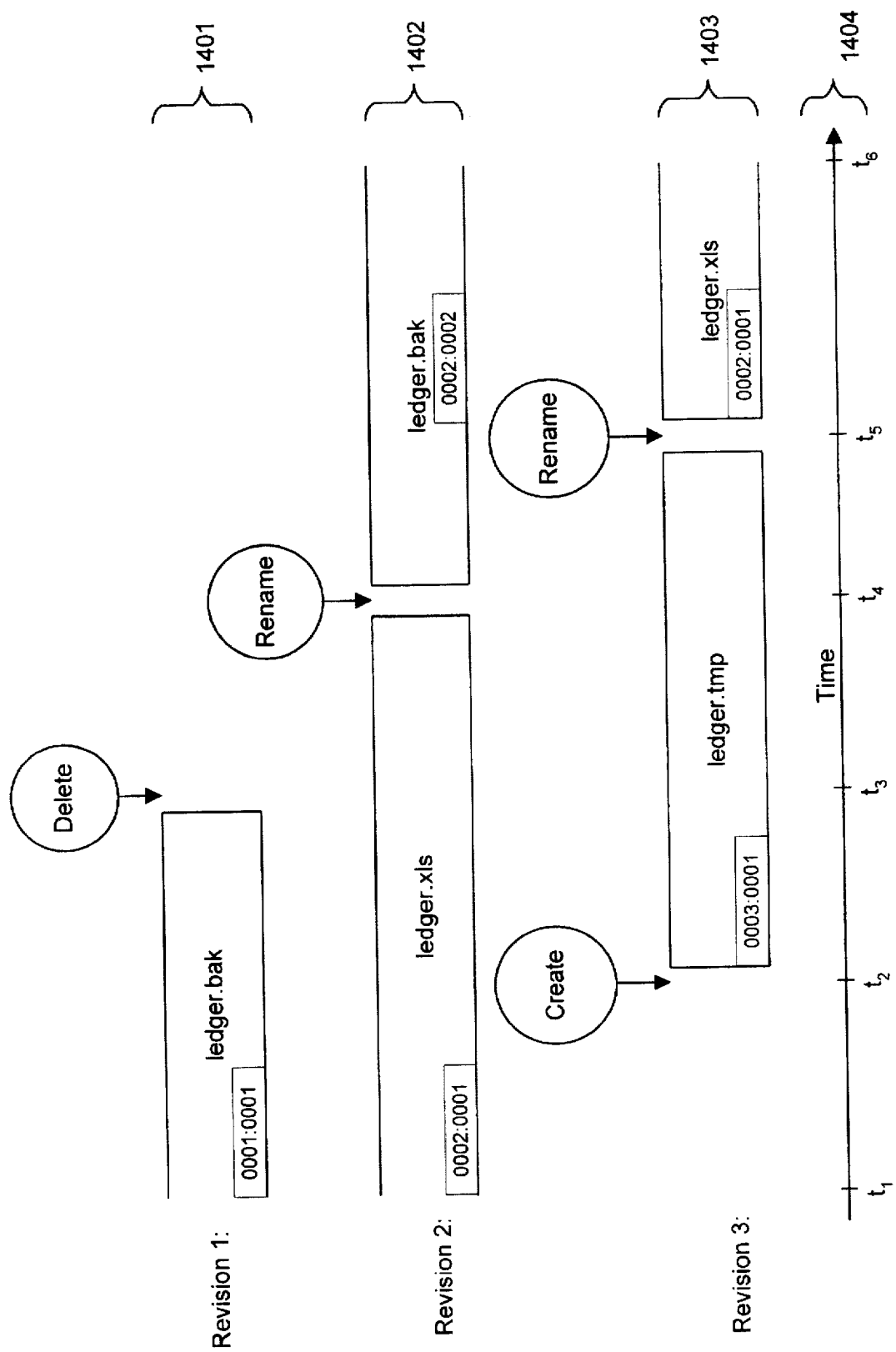
FIG. 14 is an object state timing diagram showing how the facility preferably handles the process many application programs use to save a new revision of an object.
Figure 15:
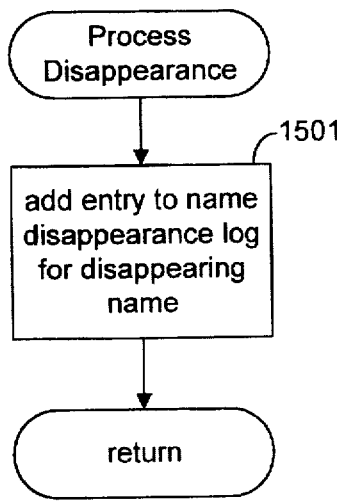
FIG. 15 is a flow diagram of the ProcessDisappearance subroutine.

FIG. 14 is an object state timing diagram showing how the facility preferably handles the process many application programs use to save a new revision of an object. At $t_4$, when the Revision 2 object is renamed from a rename-from name, "ledger.xls", to a rename-to name, "ledger.bak", the rename-from name is said to "disappear." That is, there ceases to be an object having the "disappeared" name. A name may also disappear when an object having the name is deleted. The facility preferably calls a ProcessDisappearance subroutine to add the disappeared name, in this case "ledger.xls", to a recent name disappearance log. FIG. 15 is a flow diagram of the ProcessDisappearance subroutine. The subroutine is called each time an object name disappears. In step 1501, the facility adds an entry to the name disappearance log containing the disappearing name, the object identifier for the object having the disappearing name, and any other information corresponding to the object that will be transferred to an object upon which the disappeared name reappears. At $t_5$, when the Revision 3 object is renamed "ledger.xls", this name is said to "appear." A name appears when an object having the name is created, or when an existing object is renamed to have the name. When a name appears, the facility determines whether the name is "reappearing"—that is, whether it is appearing after having recently disappeared. In order to determine whether an appearing name is reappearing, the facility calls a ProcessAppearance subroutine to check the recent name disappearance log for the appearing name. If the recent name disappearance log contains the appearing name, the facility concludes that the name is reappearing. If the facility concludes that a name is reappearing, it employs the assumption that the user intends the object having the reappearing name to replace the object having the disappeared name, and intends that links to the object having the disappeared name resolve to the object having the reappearing name. To that end, if the object having the reappearing name does not yet have an object identifier, the facility preferably "transfers," or "tunnels," the object identifier of the object having the disappeared name to the object having the reappearing name, changing the object identifier of the object having the reappearing name to that of the object having the disappeared name. (The object identifier of the object having the disappeared name is preferably stored in the recent name disappearance log for this purpose.)

Figure 16:
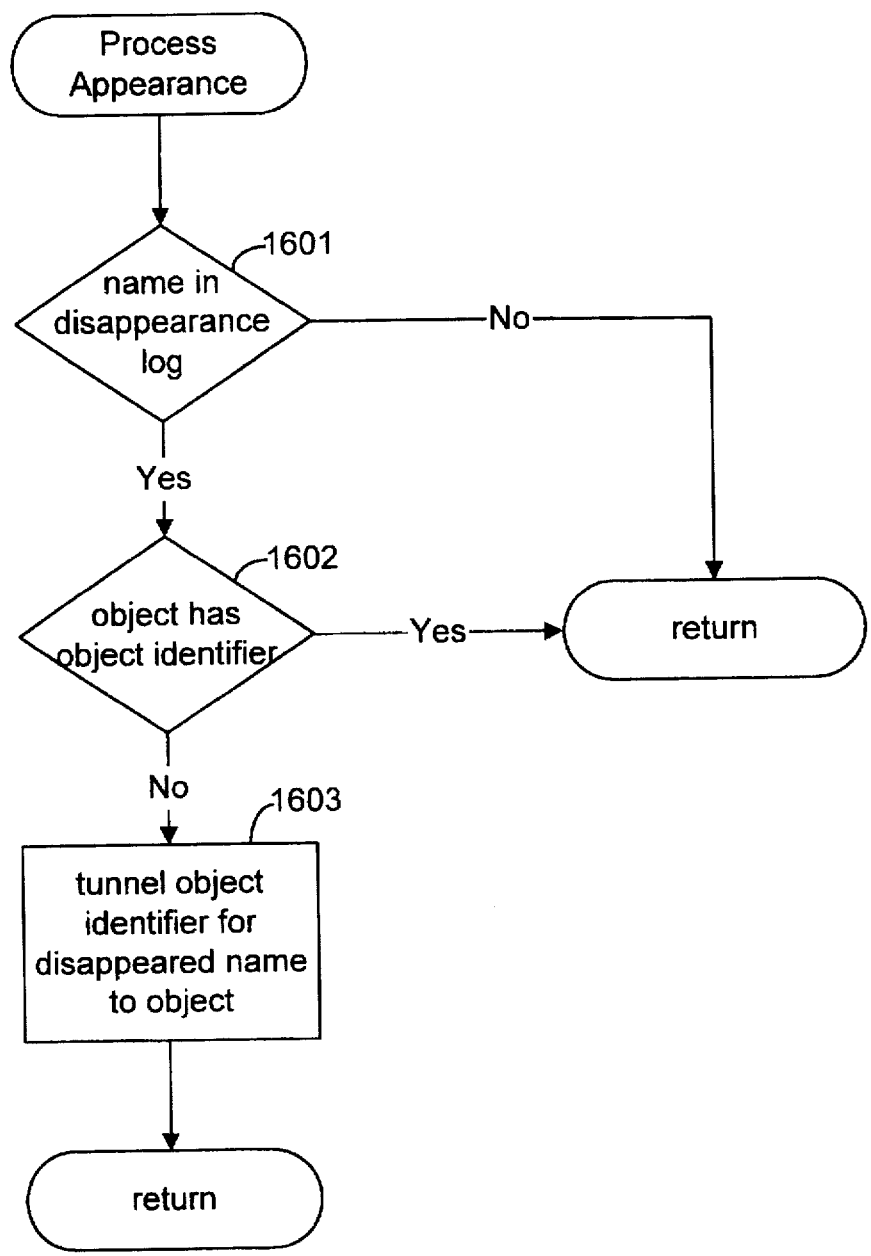
FIG. 16 is a flow diagram of the ProcessAppearance subroutine.

FIG. 16 is a flow diagram of the ProcessAppearance subroutine. The ProcessAppearance subroutine is called each time an object name appears. The facility first determines whether the appearing name is in the name disappearance log. In step 1601, if the appearing name is in the name disappearance log, then the appearing name is reappearing and the facility continues at step 1602, else the appearing name is not reappearing and the facility returns. In step 1602, if the object upon which the name is reappearing already has an object identifier, then the facility returns, else the facility continues at step 1603. Step 1602 prevents the replacement of the object's original object identifier with another, so that no links to the original object identifier are broken. In step 1603, the facility tunnels the object identifier of the object upon which the reappearing name disappeared to the object upon which the name is reappearing. Step 1603 preferably also includes copying other characteristics of the object upon which the reappearing name disappeared to the object upon which the name is reappearing, such as properties, attributes, and a long object name. In the example, the object identifier of the Revision 3 object is changed to "0002:0001" at $t_5$. If the object having the disappeared name still exists (i.e., was renamed, not deleted), the facility preferably assigns the object a new object identifier. The new object identifier preferably has the same lineage identifier and a different distinguished identifier. In the example, the object identifier of the Revision 2 object is changed to "0002:0002" at $t_5$. Because the link created at $t_1$ contains the object identifier "0002:0001", at $t_5$ the link resolves to the Revision 3 object. If the Revision 3 object was deleted or moved to an inaccessible volume, the link would resolve to the Revision 2 object, which has the same lineage identifier and a different distinguished identifier. The facility also preferably copies other characteristics associated with the object having the disappeared name to the object having the reappearing name, such as properties, attributes, and a long object name.

Name appearances can occur frequently in a file system, requiring the facility to frequently search the list of disappeared names stored in the name disappearance log. In order to minimize the processing and memory access resources consumed each time this search is conducted, the facility preferably employs a rotating disappeared name hash list to expedite the determination of whether the recent name disappearance log contains an appearing name. The rotating disappeared name hash list contains a small number of entries, each corresponding to a recently disappeared name and consisting of the name reduced to a small value, e.g., 16 bits, by a hashing algorithm. Each time a disappeared name is added to the recent name disappearance log, the contents of the oldest entry are replaced with the reduced, or "hashed," value for the disappeared name. When the facility attempts to determine whether an appearing name is reappearing, it first hashes the appearing name and checks the rotating disappeared name hash list for the resulting hashed value. Because checking the rotating disappeared name hash list for the hashed value involves comparing a small hashed value to a small number of other small hashed values, the checking proceeds very quickly. If the rotating disappeared name hash list does not contain the hashed value, then the facility concludes that the appearing name is not reappearing, else the facility proceeds to check the recent name disappearance list for the appearing name.

The facility still further overcomes the problem with archiving and restoring a source object. When an archived object is restored, the facility does not change its lineage identifier, but does assign a new distinguished identifier. As a result, the restore does not introduce another object with an object identifier identical to an existing object. If a link is created to an original source object, and the original source object is thereafter archived and restored, the restored source object has the same lineage identifier as the original source object and a different distinguished identifier. If the link is then resolved, the facility first looks for an object with matching lineage identifier and distinguished identifier. If the original source object still exists, this search will find it. If the original source object no longer exists, the facility will then search for any object having the same lineage identifier. The second search will find the restored source object, and the facility will resolve to it. Because archiving and restoring does not result in two different objects having the same object identifier, the facility is not subject to the problem with archiving and restoring a source object.

The facility yet further overcomes a link resolution problem encountered when copying groups of files. Many file systems have a command for simultaneously copying a group of objects, such as all of the objects in a particular directory, or even all of the object in a subtree of the file system hierarchy. FIGS. 17A-17B show the problem introduced by using the object group copy command to copy both a client object and the object that is the source of the link in the client object. FIG. 17A shows a "report.doc" object 1701 containing a link 1702 to a source "ledger.xls" object 1703. The link contains the "ledger.xls" object's lineage identifier "7177" and its distinguished identifier "2155". The "report.doc" and "ledger.xls" objects relate to a company called "acme", and are contained in a "\companies\acme" directory. A "\companies\ajax" directory is initially empty. In order to create objects corresponding to objects 1701 and 1703 that relate to a company called "ajax", a user uses the object group copy command to copy objects 1701 and 1703 to the "\companies\ajax" directory, intending to edit both of the copied objects to relate to the company called "acme". FIG. 17B shows the client and source objects copied from the "\companies\acme" directory to the "\companies\ajax" directory using the object group copy command. Objects 1701 and 1703 are unchanged from FIG. 17A. A copy 1711 of the "report.doc" object 1701 has been created in the "\companies\ajax" directory, as has a copy 1713 of the "ledger.xls" object 1703. Both of the copy objects have the same lineage identifiers as the corresponding original objects and different distinguished identifiers than the corresponding original objects, in order to distinguish the copies from the originals. The copy 1711 of the "report.doc" object, because it is an exact copy, contains an exact copy 1712 of the link 1702. As shown by the arrow from the link copy 1712, the link copy still resolves to the original "ledger.xls" object 1703 instead of the copy "ledger.xls" object 1713, which has a different distinguished identifier than the distinguished identifier stored in the link 1712. While this is of little concern while the original "ledger.xls" object 1703 and the copy "ledger.xls" object 1713 remain identical, users may soon edit the copy "ledger.xls" object 1713 in order to change the data incorporated in the copy "report.doc" object 1711 by the link 1712. Since the link 1712 resolves to the original "ledger.xls" object 1703, the data incorporated in the copy "report.doc" object 1711 by the link 1712 does not change, thereby frustrating the expectation of the users.

Figure 17C:
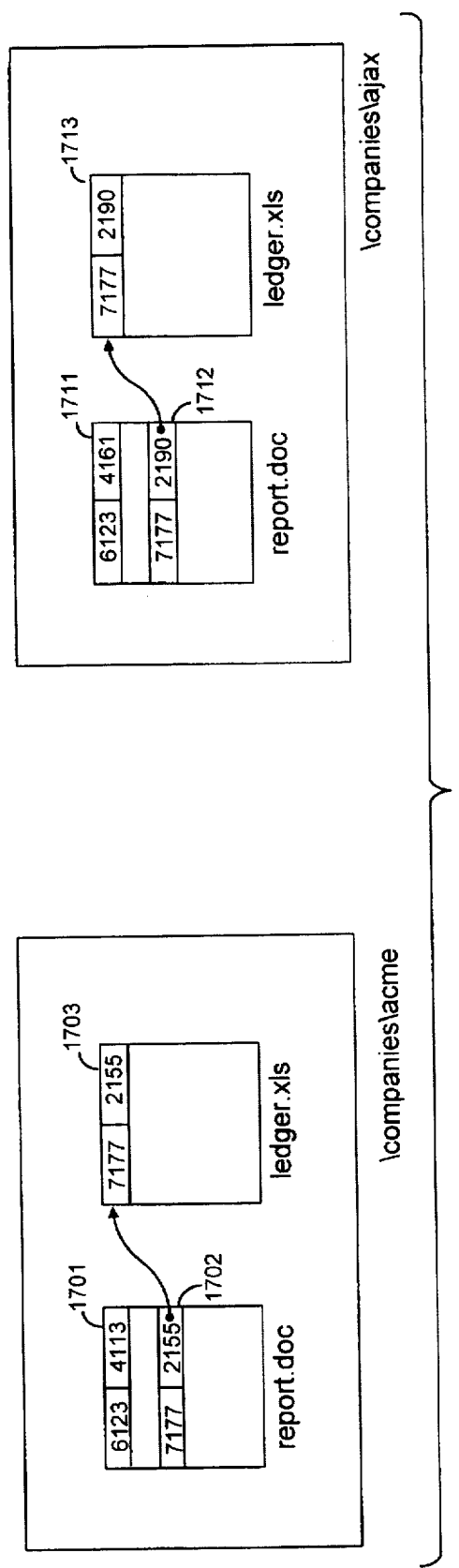
FIG. 17C shows how the facility overcomes the link resolution problem encountered when copying groups of files.

FIG. 17C shows how the facility overcomes the link resolution problem encountered when copying groups of files. In order to overcome the link resolution problem encountered when copying groups of files, the facility updates link 1712 to refer to the copy "ledger.xls" object 1713, as shown in FIG. 17C. This involves assembling data on copied links while performing the group copy command and updating the necessary links according to the assembled data immediately after completing the group copy command. While performing the group copy command, the facility build two tables. A client object table contains an entry for each client object copied by the group copy command, which indicates the filename of the client object and the object identifier of each link contained by the client object. A source object table contains an entry for each source object copied by the group copy command, which indicates the object identifier of the original source object and the object identifier of the copy source object (which has the same lineage identifier as the original source object but a different distinguished identifier than the original source object). Immediately after completing the group copy command, the facility traverses the client object table. For each entry of the client object table, the facility retrieves the object identifier of each contained link. The facility looks up this object identifier in the source object table to determined whether the source of the link having this object identifier was copied by the object group copy command. If the object identifier appears as an original source object object identifier in the source object table, then the source of the link was copied by the object group copy command, and the facility updates this object identifier in the link in the copy client object to the copy object object identifier from the source object table, using the filename from the client object table to access the client file.

If, when the facility is resolving a link, it finds an object whose object identifier matches the one in the link, the facility immediately resolves to that object, since only one object can exist with a given object identifier. If, on the other hand, the facility cannot find an object with an object identifier that matches the one in the link, the facility may be able to find several candidate objects whose lineage identifiers match the lineage identifier and the link. Because their lineage identifiers match the one in the link, all of the candidate objects are related to the original source object, and some method must be used to select one of them to resolve the link to. The flow diagrams of the MatchObject subroutines show that the subroutines display a list of such objects and allow the user to choose the one to which the facility should resolve the link. In some situations the facility is preferably able to use information about the candidate objects and the client object to automatically select a candidate object. For example, if only one candidate object has the same owner as the client object, the facility will choose that candidate object. Similarly, if one candidate object is much closer in the file system to the client object than the other candidate objects, i.e., can be reached from the directory containing the client object by moving through fewer directories than the other candidate objects, the facility will select the closer object. Also, if the filename portion of the pathname of one of the candidate objects matches the filename portion of the pathname stored in the link, the facility will select this object.

Since an object stored in a first volume of a computer system may be moved to a second volume either in the same computer system or a different computer system, when resolving a link, the facility is preferably able to search for the source object in volumes other than the one in which the object containing the link resides. While an exhaustive search of every accessible volume would likely be most effective, the number of accessible volumes may number in the hundreds, making an exhaustive search unfeasible, or at least inconvenient. Instead, the facility selects volumes for searching that are significantly likely to contain the source object. FIG. 8 is a flow diagram of the volume search progression for resolving a link. The figure shows the order in which various related volumes are preferably searched. If the sought source object is found in some step, the search progression terminates.

The link preferably contains one or more pathnames at which the source object was earlier located. The pathnames stored in the link preferably include both a relative pathname, describing the location of the source object relative to the client object, and an absolute pathname, describing the location of the source object relative to the entire volume hierarchy. In step 1801, the facility checks to see if the source object still exists at any of these pathnames. Step 1801 is preferably performed before any other searching step, since it is the only searching step that does not involve searching entire volumes. Any objects found by the facility in step 1801 using pathnames stored in the link are preferably verified by comparing their object identifiers with that stored in the link.

The link also preferably contains an indication of a hinted volume, which is a volume that previously held the source object. The hinted volume in the link is preferably updated each time the link is resolved. In step 1802, the facility searches the hinted volume for the source object.

In step 1803, the facility searches all local volumes, that is, all of the storage volumes contained by the computer system where the client object resides.

Each user preferably maintains a list of the volumes in which he or she typically stores source objects, called a manual volume list. In step 1804, the facility searches the volumes in the manual volume list for the source object.

Figure 19:
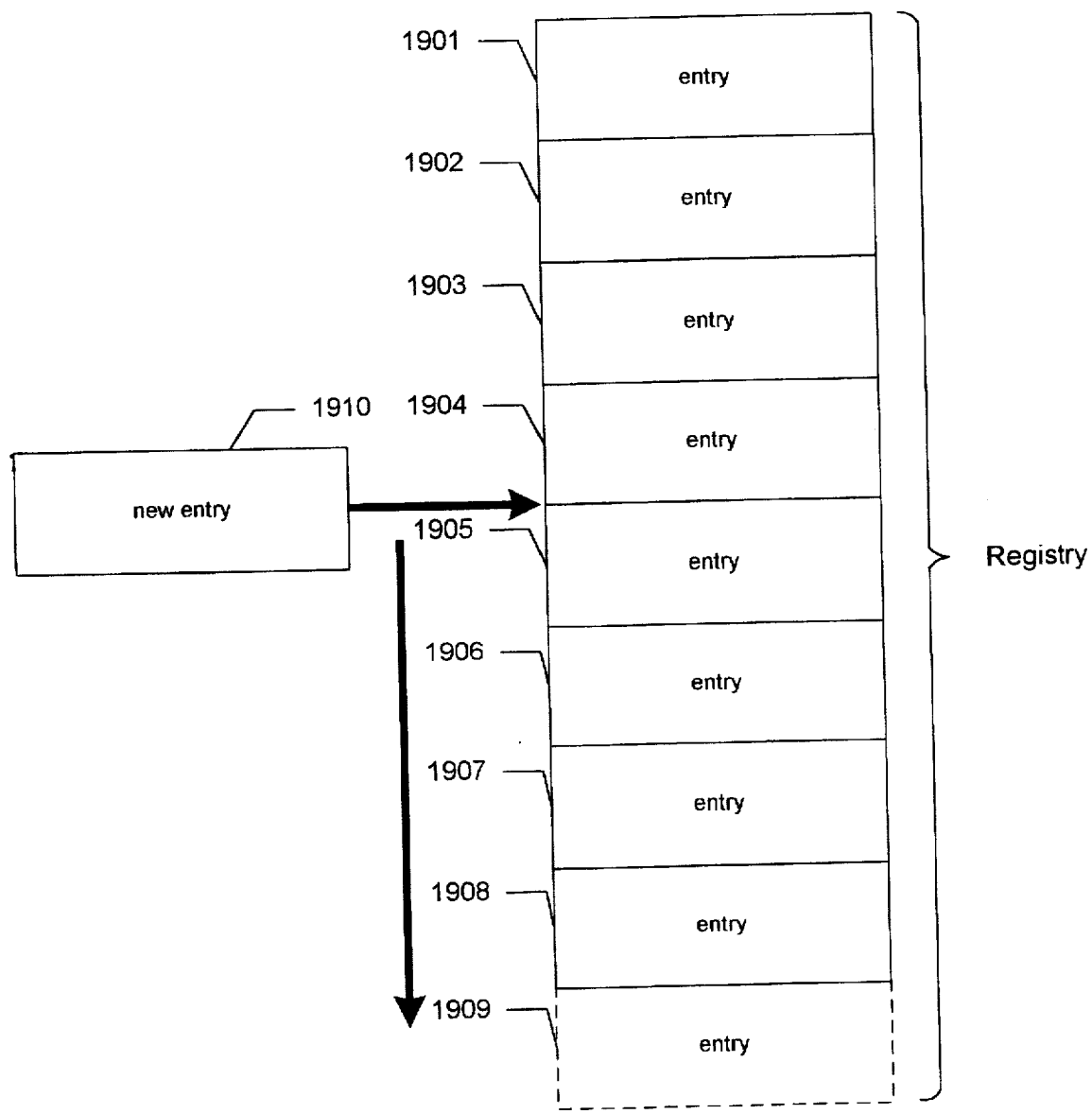
FIG. 19 is a diagram showing a sample registry.

Each time a computer system connects to a volume of another computer system using its network connection, it preferably makes an entry in a connection log. The facility uses the connection log as the source for an automatic volume list of volumes of other computer systems likely to contain source objects, called a "registry." The facility preferably maintains the registry such that entries in the connection log are added to the registry. An entry is retained in the registry if source objects regularly are found in the corresponding remote volume and discarded if source objects are seldom found in the corresponding remote volume. In step 1805, the facility searches the volumes in the registry. Because the facility is able to search several volumes likely to contain the source object, chances of finding the source object can be optimized against resources required to perform the search. FIG. 19 is a diagram showing a sample registry. The registry contains a fixed number of entries, here nine entries 1901-1909. Each entry contains a path to (also known as "an indication of" a remote volume that may contain source objects. Entry 1901 contains a path to the volume most likely to contain source objects, entry 1902 a path to the volume second most likely, and so forth. When step 1805 is performed, the facility searches for the source object in the volume for each entry in the registry, beginning with entry 1901. If the source object is found in one of the remote volumes, that volume's entry is moved upwards in the registry from the present position, preferably to the top of the registry, shifting any displaced entries down one position. When the computer system connects to a new remote volume, the facility checks the see whether an entry exists in the registry for the new volume. If none does, the facility inserts a new entry 1910 into the registry containing a path to the new volume, preferably in the middle of the registry. This shifts the entries below the insertion point down one position each, and causes the lowest entry 1909 to be removed from, or "fall off the bottom" of, the registry. This permits the new entry an opportunity to be promoted to the top if a source object is found in its volume before it falls off the bottom. One skilled in the art would appreciate that other approaches could be substituted to retain in the registry the entries corresponding to remote volumes in which source objects are regularly found. For example, the facility may retain or discard registry entries based on the number of source objects found in the corresponding remote volume, the rate of which source objects are found in the corresponding remote volume, or the time since a source object was last found in the corresponding remote volume.

The facility preferably maintains a list of remote volume lists. Each remote volume list is maintained on a separate computer system, and lists volumes likely to contain source objects. In step 1806, the facility searches all the volumes in all of the remote volume lists for the source object. In a preferred embodiment, the facility also uses the list of remote volume lists itself as a volume list, searching the volumes containing the listed remote volume lists for the source object.

In step 1807, the facility broadcasts a search request to every machine to which the local machine is connected. The search request instructs each connected machine to search all of its volumes for the source object, and report back to the local machine if the computer system locates the source object. Step 1807 consumes a relatively large amount of processing and network transfer resources. As such, the facility is preferably configurable to omit this step. The facility then returns.

Figure 18:
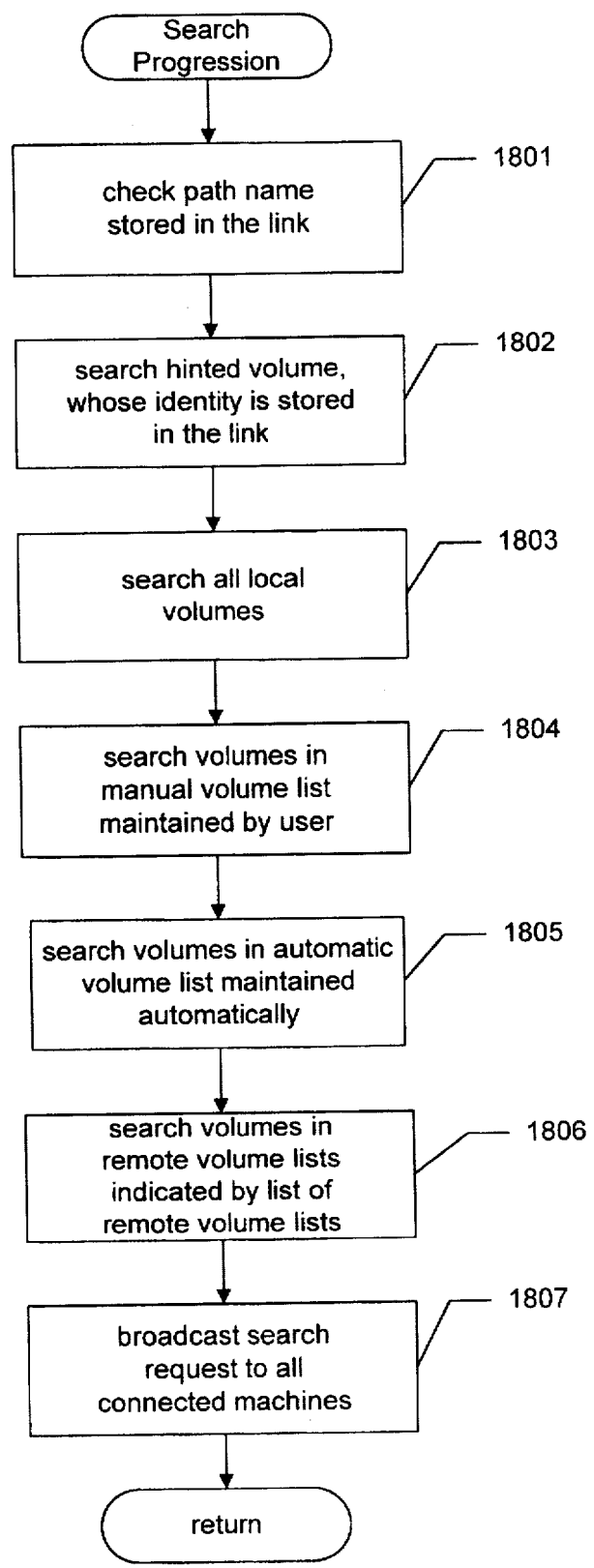
FIG. 18 is a flow diagram of the volume search progression for resolving a link.

Some volumes identified for searching by the facility in the steps shown in FIG. 18 may not support the maintenance of object identifiers with respect to source objects. For these "down-level" volumes, instead of searching for the source object according to object identifier, the facility preferably searches for the source object according to its creation date and time. For this reason source object location date and time are stored in the link. While creation date and time are less discriminating than a more detailed lineage identifier and contain no information corresponding to a distinguished identifier to distinguish the original source object from copies, they do provide an indication of lineage, since they are typically copied when their objects are copied.

Though generally objects keep the same lineage identifier from creation to deletion, there is an instance in which an existing object should be assigned a new lineage identifier. Users often use existing, complete objects as templates for new objects. That is, a user might load an existing, complete object; edit it, deleting most of its content but leaving most of its structure and formatting; and save it under a new name. This would generally be regarded by the facility as a mere copying of the object, to which the facility would respond by assigning the same lineage identifier and a new distinguished identifier. However, these "templated" objects usually have entirely different contents than their "templates," so that no link created to the "template" object should be resolved to the "templated" object. Therefore, in this situation the facility assigns a new lineage identifier and a new distinguished identifier to the "templated" object. A "templated" object is said to be substantial alteration of its "template" object.

The facility preferably uses a heuristic to determine whether an object that seems to have been copied was actually templated. When an object is loaded, the facility notes its size. When any object is saved with a new name, the facility checks to see whether the object size has been substantially reduced since it was loaded (e.g., is 20% or less of its original size). If so, the facility assigns the saved object a new lineage identifier as well as a new distinguished identifier. If not, the facility assigns the saved object the same lineage identifier as the loaded object, but a different distinguished identifier.

While this invention has been shown and described with reference to preferred embodiments, it will be understood by those skilled in the art that various changes or modifications in form and detail may be made without departing from the spirit and scope of this invention. For example, the facility could track the lineage of objects not stored within a computer system, such as physical documents or artworks. Further, object identifiers with different compositions could convey lineage information.

We claim:

1. A method in a computer system, the computer system supporting objects that come into existence either by originating a new object or copying an existing object, the method for tracking a plurality of objects that derive from a common object creation, comprising the steps of:

originating an object;

generating a lineage identifier to differentiate the origination of the originated object from the origination of other objects;

associating the generated lineage identifier with the originated object;

copying the originated object to a copy object;

when copying the originated object to the copy object, associating the lineage identifier associated with the originated object with the copy object, whereby the lineage identifier associated with the copy object indicates that the copy object derives from the origination of the originated object;

generating an object identifier for each object, the object identifier comprising the lineage identifier associated with the object and a distinguished identifier, the distinguished identifier being different from the distinguished identifier of every other object identifier with the same lineage identifier;

associating the generated object identifier with each object;

when copying the originated object to a copy object, storing an indication of the copy, including the lineage identifier of the originated object and the copy object and the distinguished identifiers of the originated object and the copy object, in a copy log;

deleting the originated object;

when deleting the originated object, retrieving the indication of the copy from the copy log; and changing the distinguished identifier of the copy object to the distinguished identifier of the originated object stored in the indication of the copy.

2. A method in a computer system of resolving a link to a source object, the computer system having a plurality of objects, each object having a lineage identifier identifying the creation from which the object derives and having a distinguished identifier to differentiate objects with the same lineage identifier, the link containing the lineage identifier and the distinguished identifier of the source object, the method comprising the steps of:

selecting the lineage identifier and the distinguished identifier of the link;

searching for an object with the selected lineage identifier and distinguished identifier;

when an object with the selected lineage identifier and distinguished identifier is found, assigning the found object as the source object of the link; and when an object with the selected lineage identifier and distinguished identifier is not found, searching for an object with the selected lineage identifier and, when an object with the selected lineage identifier is found, assigning the found object as the source object of the link.

3. The method of claim 2 wherein the plurality of objects each have a creation time and wherein a creation time is stored in the link, further including the steps of:

searching for an object with the creation time stored in the link; and when an object with the creation time stored in the link is found, assigning the found object as the source object of the link.

4. The method of claim 2 wherein the step of searching for an object with the selected lineage identifier searches for all objects having the selected lineage identifier and, when only one object with the lineage identifier is found, automatically assigns the found source object as the source object of the link.

5. The method of claim 2, further including the step of, if more than one object is found, choosing one found object and assigning the chosen found object as the source object of the link.

6. The method of claim 5 wherein the choosing step is performed by a user, further including the step of displaying to the user information about at least a portion of the found objects.

7. The method of claim 2, further including the step of changing the distinguished identifier stored in the link to the distinguished identifier of the found object.

8. The method of claim 2, further including the steps of:
when copying the source object to a copy object, storing an indication of the copy, including the lineage identifier of the source object and the copy object and the distinguished identifiers of the source object and the copy object, in a copy log;
deleting the source object;
when deleting the source object, retrieving the indication of the copy from the copy log; and
changing the distinguished identifier of the copy object to the distinguished identifier of the source object stored in the indication of the copy.

9. A method in a computer system for establishing and resolving a link to a source object wherein the computer system contains accessible objects, the method comprising the steps of:
when creating the source object, generating an object identifier comprising a lineage identifier to identify the creation of the source object and a distinguished identifier for distinguishing the source object from every other object having the same lineage identifier;
associating the generated object identifier with the source object;
when establishing a link to the source object, including the object identifier associated with the source object;
resolving the link to the source object by identifying an object having the same lineage identifier and distinguished identifier as the link, or, if no such object exists, identifying an object having merely the same lineage identifier as the link;
when resolving the link to the source object, first searching the accessible objects for an object whose lineage identifier and distinguished identifier match those included in the link; and
if no accessible object with a matching lineage identifier and distinguished identifier is found, searching the accessible objects for an object whose lineage identifier matches that included in the link but whose distinguished identifier does not match that included in the link.

10. A method in a computer system for establishing and resolving a link to a source object wherein the computer system contains accessible objects, the method comprising the steps of:
when creating the source object, generating an object identifier comprising a lineage identifier to identify the creation of the source object and a distinguished identifier for distinguishing the source object from every other object having the same lineage identifier;
associating the generated object identifier with the source object;
when establishing a link to the source object, including the object identifier associated with the source object;
resolving the link to the source object by identifying an object having the same lineage identifier and distinguished identifier as the link, or, if no such object exists, identifying an object having merely the same lineage identifier as the link;
when resolving a link to the source object, searching the accessible objects for any objects whose lineage identifier matches the lineage identifier included in the link;
searching the objects whose lineage identifier matches the lineage identifier included in the link for an object whose distinguished identifier matches the distinguished identifier included in the link;
if an object whose distinguished identifier matches the distinguished identifier included in the link is found, accessing the found object; and
if an object whose distinguished identifier matches the distinguished identifier included in the link is not found, accessing an object whose lineage identifier matches the lineage identifier included in the link but whose distinguished identifier does not match the distinguished identifier included in the link.

11. A method in a computer system for maintaining properties relating to an object through an update of the object, each object having a name, the method comprising the steps of:
storing a first object having a first name and having associated with it one or more properties relating to the first object;
receiving an indication that the name of the stored first object has been changed to a second name;
within a predetermined period after receiving an indication that the name of the stored first object has been changed to the second name, receiving an indication that the name of a second object has been changed to the first name; and
in response to receiving an indication that the name of the second object has been changed to the first name, associating with the second object the properties associated with the first object.

12. The method of claim 11 wherein one of the properties associated with the first object is an object identifier, and wherein the associating step associates the object identifier with the second object.

13. A method in a computer system for determining that a first object has been effectively updated, the first object having a first name, a unique identifier, and data, the method comprising the computer-implemented steps of:
creating a second object, the created object having a unique identifier and data of the first object that has been updated;
changing the name of the first object to a second name;
changing the name of the second object to the first name; and
when the steps of changing the name of the first object and changing the name of the second object occur within a short time interval, indicating that the second object is an update of the first object and changing the unique identifier of the second object to the unique identifier of the first object.

14. A method in a computer system for maintaining through an update of an object information relating to the object, comprising the steps of:
storing a first object having a first name;
storing in conjunction with the first object information relating to the first object;
receiving an indication that the first object has been deleted;

within a predetermined period of receiving an indication that the first object has been deleted, receiving an indication that a second object has been created using the first name;

in response to the step of receiving an indication that the second object has been created using the first name, storing the information relating to the first object in conjunction with the second object;

in response to receiving an indication that the first object has been deleted, adding the first name to a list of names of recently deleted objects;

in response to receiving an indication that the first object has been deleted, hashing the first name;

adding the hashed first name to a list of hashed names of recently deleted objects;

receiving an indication that an object having a name has been created;

hashing the name of the created object;

comparing the hashed name of the created object to the hashed names of recently deleted objects in the list of hashed names;

if the hashed name of the created object matches one of the hashed names of recently deleted objects in the list of hashed names, comparing the name of the created object to the names of recently deleted object in the list of names; and if the name of the second object is the same as the first name; providing an indication that a second object has been created using the first name.

15. An apparatus for resolving a link to a source object, the computer system having a plurality of objects, each object having a lineage identifier identifying the creation from which the object derives and having a distinguished identifier to differentiate objects with the same lineage identifier, the link containing the lineage identifier and the distinguished identifier of the source object, the apparatus comprising:

a first searching system for searching for an object having the lineage identifier and distinguished identifier of the link;

a first link source object assignment system for assigning the found object as the source object of the link when an object with the selected lineage identifier and distinguished identifier is found;

a second searching system for searching for an object with the selected lineage identifier when an object with the selected lineage identifier and distinguished identifier is not found; and a second source object assignment system for assigning the found object as the source object of the link when an object with the selected lineage identifier is found.

16. The apparatus of claim 15 wherein the second searching system includes a third searching system searching for all objects having the selected lineage identifier and, when only one object with the lineage identifier is found, automatically assigns the found source object as the source object of the link.

17. The apparatus of claim 15, further including:

a copy log memory for storing an indication of the copy, including the lineage identifier of the source object and the copy object and the distinguished identifiers of the source object and the copy object, in a copy log when copying the source object to a copy object;

a source object deletion system for deleting the source object;

a copy indication retrieval system for retrieving the indication of the copy from the copy log when deleting the source object; and a distinguished identifier alteration system for changing the distinguished identifier of the copy object to the distinguished identifier of the source object stored in the indication of the copy.

18. An apparatus for maintaining information relating to an object through an update of the object, comprising:

a memory for storing a first object having a first name and a second object having a second name;

an information storage subsystem for storing in conjunction with the first object information relating to the first object;

a name transfer monitor for detecting when the name of the first object is changed to a third name and, within a predetermined period thereof, the name of the second object is changed to the first name; and an information transfer subsystem for storing the information relating to the first object in conjunction with the second object when the name transfer monitor detects that the name of the first object has been changed to a third name and, within a predetermined period thereof, the name of the second object has been changed to the first name.

19. A computer-readable medium whose contents cause a computer system supporting objects that come into existence either by originating a new object or copying an existing object to track a plurality of objects that derive from a common object creation, by performing the steps of:

originating an object;

generating a lineage identifier to differentiate the origination of the originated object from the origination of other objects;

associating the generated lineage identifier with the originated object;

copying the originated object to a copy object;

when copying the originated object to the copy object, associating the lineage identifier associated with the originated object with the copy object, whereby the lineage identifier associated with the copy object indicates that the copy object derives from the origination of the originated object;

when copying the originated object to a copy object, storing an indication of the copy, including the lineage identifier of the originated object and the copy object and the distinguished identifiers of the originated object and the copy object, in a copy log;

deleting the originated object;

when deleting the originated object, retrieving the indication of the copy from the copy log; and changing the distinguished identifier of the copy object to the distinguished identifier of the originated object stored in the indication of the copy.

20. A computer-readable medium whose contents cause a computer system to resolve a link to a source object, the computer system having a plurality of objects, each object having a lineage identifier identifying the creation from which the object derives and having a distinguished identifier to differentiate objects with the same lineage identifier, the link containing the lineage identifier and the distinguished identifier of the source object, by performing the steps of:

selecting the lineage identifier and the distinguished identifier of the link;

searching for an object with the selected lineage identifier and distinguished identifier;

when an object with the selected lineage identifier and distinguished identifier is found, assigning the found object as the source object of the link; and when an object with the selected lineage identifier and distinguished identifier is not found, searching for an object with the selected lineage identifier and, when an object with the selected lineage identifier is found, assigning the found object as the source object of the link.

* * * * *

UNITED STATES PATENT AND TRADEMARK OFFICE
CERTIFICATE OF CORRECTION

PATENT NO. : 5,721,919

DATED : February 24, 1998

INVENTOR(S) : Morel et al.

It is certified that error appears in the above-identified patent and that said Letters Patent is hereby corrected as shown below:

| Col./Line | Error Reads | Should Read |
|---|---|---|
| 5/32 | identifier | identifiers |
| 9/33 | block 60 | block 760 |
| 14/1 | 16 | t6 |

7/20-23 Error Reads: when the user copies a group of objects that contains both a (for latter case, only lineage identifier copied: a new distinguished id is used.) and the source of the link.

7/20-23 Should Read: when the user copies a group of objects that contains both a link and the source of the link, the facility preferably copies the lineage identifiers of the original group of objects to the copied group of objects and creates new distinguished identifiers for the copied group of objects.

Signed and Sealed this

Tenth Day of October, 2000

Attest:

Attesting Officer

Q. TODD DICKINSON

Director of Patents and Trademarks